United States Patent
Takata et al.

(10) Patent No.: US 9,865,889 B2
(45) Date of Patent: Jan. 9, 2018

(54) SOLID ELECTROLYTE FUEL BATTERY HAVING ANODE AND CATHODE GAS SUPPLY CHANNELS WITH DIFFERENT CROSS-SECTION AREAS

(71) Applicant: Murata Manufacturing Co., Ltd., Nagaokakyo-shi, Kyoto-fu (JP)

(72) Inventors: Kazuhide Takata, Nagaokakyo (JP); Hideaki Nakai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 336 days.

(21) Appl. No.: 14/669,473

(22) Filed: Mar. 26, 2015

(65) Prior Publication Data

US 2015/0200407 A1 Jul. 16, 2015

Related U.S. Application Data

(63) Continuation of application No. PCT/JP2013/075407, filed on Sep. 20, 2013.

(30) Foreign Application Priority Data

Sep. 27, 2012 (JP) .................................. 2012-214246
Jan. 31, 2013 (JP) .................................. 2013-016822

(51) Int. Cl.
*H01M 2/38* (2006.01)
*H01M 8/04082* (2016.01)
(Continued)

(52) U.S. Cl.
CPC ..... *H01M 8/04201* (2013.01); *H01M 4/9025* (2013.01); *H01M 8/0215* (2013.01);
(Continued)

(58) Field of Classification Search
CPC ............. H01M 8/2425; H01M 8/0215; H01M 8/04089; H01M 4/9025; H01M 8/0236;
(Continued)

(56) References Cited

U.S. PATENT DOCUMENTS 5,399,442 A 3/1995 Shundo
2008/0280185 A1* 11/2008 Sasaki ............... H01M 8/04089
429/413
2013/0130144 A1* 5/2013 Todo .................... H01M 8/0258
429/456

FOREIGN PATENT DOCUMENTS

JP H05-129033 A 5/1993
JP H10-340735 A 12/1998
(Continued)

OTHER PUBLICATIONS

International Search Report issued for PCT/JP2013/075407, dated Nov. 26, 2013.

*Primary Examiner* — Gary Harris
(74) *Attorney, Agent, or Firm* — Arent Fox LLP

(57) ABSTRACT

A solid electrolyte fuel battery having a fuel gas supply channel that is composed of a first anode gas supply channel part, at least a part of an inner wall surface of which is a fuel electrode layer, and a second anode gas supply channel part; and an air supply channel that is composed of a first cathode gas supply channel part, at least a part of an inner wall surface of which is an air electrode layer, and a second cathode gas supply channel part. The cross-section area of the first anode gas supply channel part is larger than the cross-section area of at least a portion of the second anode gas supply channel part. The cross-section area of the first cathode gas supply channel part is larger than the cross-section area of at least a portion of the second cathode gas supply channel part.

18 Claims, 18 Drawing Sheets

(51) Int. Cl.
*H01M 8/2425* (2016.01)
*H01M 8/0215* (2016.01)
*H01M 8/04089* (2016.01)
*H01M 4/90* (2006.01)
*H01M 8/0236* (2016.01)
*H01M 8/1246* (2016.01)
*H01M 8/1253* (2016.01)
*H01M 8/1213* (2016.01)
*H01M 8/2475* (2016.01)
*H01M 8/124* (2016.01)

(52) U.S. Cl.
CPC ..... *H01M 8/0236* (2013.01); *H01M 8/04089* (2013.01); *H01M 8/1213* (2013.01); *H01M 8/1246* (2013.01); *H01M 8/1253* (2013.01); *H01M 8/2425* (2013.01); *H01M 8/2475* (2013.01); *H01M 2008/1293* (2013.01); *H01M 2300/0077* (2013.01)

(58) Field of Classification Search
CPC ............. H01M 8/2475; H01M 8/1246; H01M 8/1253; H01M 8/1213; H01M 8/04201; H01M 2008/1293; H01M 2300/0077
USPC ........................................................ 429/457
See application file for complete search history.

(56) References Cited

FOREIGN PATENT DOCUMENTS

WO  WO 2008/044429 A1   4/2008
WO  WO 2011/148769 A1   12/2011

* cited by examiner

SOLID ELECTROLYTE FUEL BATTERY HAVING ANODE AND CATHODE GAS SUPPLY CHANNELS WITH DIFFERENT CROSS-SECTION AREAS

CROSS REFERENCE TO RELATED APPLICATIONS

The present application is a continuation of International application No. PCT/JP2013/075407, filed Sep. 20, 2013, which claims priority to Japanese Patent Application No. 2012-214246, filed Sep. 27, 2012, and Japanese Patent Application No. 2013-016822, filed Jan. 31, 2013, the entire contents of each of which are incorporated herein by reference.

FIELD OF THE INVENTION

The present invention generally relates to a solid electrolyte fuel battery, and particularly to a solid electrolyte fuel battery having supply channels of an anode gas and a cathode gas.

BACKGROUND OF THE INVENTION

Generally, a planar solid electrolyte fuel battery (also referred to as a solid oxide fuel cell (SOFC)) is composed of a plurality of planar cells, as a power generating element, each composed of an anode (a negative electrode), a solid electrolyte and a cathode (a positive electrode), and a separator (also referred to as an interconnector) arranged between a plurality of cells. The separator electrically connects a plurality of cells to one another in series and is arranged between a plurality of cells in order to separate gases supplied to each of the plurality of cells, specifically in order to separate a fuel gas (e.g., hydrogen) as an anode gas supplied to an anode from an oxidant gas (e.g., air) as a cathode gas supplied to a cathode.

Conventionally, the separator is formed of conductive ceramic materials such as lanthanum chromite ($LaCrO_3$). When the separator is formed by use of such a conductive material, it is possible to make a member serving a dual function in the above-mentioned electrical connection and separation of gas by one material.

For example, WO 2008/044429 A (hereinafter, referred to as Patent Document 1) discloses a structure of a solid electrolyte fuel battery.

A solid electrolyte fuel battery disclosed in Patent Document 1 includes an intercellular separation part disposed between a plurality of cells, each of which is composed of a fuel electrode layer (anode layer), a solid electrolyte layer and an air electrode layer (cathode layer), and a gas passage structure part having a fuel gas passage for supplying a fuel gas to each cell and an air passage for supplying air to each cell. The intercellular separation part, the gas passage structure part and the cell are integrally formed. Since a main body of the gas passage structure part serving the function of a manifold is composed of an electrically insulating body forming the intercellular separation part serving the function of a separator, and the gas passage structure part and the electrically insulating body forming the intercellular separation part are continuously formed, a portion serving the dual function of a separator and a manifold is continuously formed.

Patent Document 1: WO 2008/044429 A

SUMMARY OF THE INVENTION

In the solid electrolyte fuel battery disclosed in Patent Document 1, when a cross-section area of a fuel gas passage or an air gas passage is decreased, there is a problem that a gas is ununiformly supplied to the inside of the cell. On the other hand, when the cross-section area of the fuel gas passage or the air gas passage is increased, since a gas supply channel itself is a space, there is a problem that the strength of the solid electrolyte fuel battery in which a gas supply channel and a cell are integrally formed is reduced.

Thus, it is an object of the present invention to provide a solid electrolyte fuel battery in which a gas supply channel and a cell are integrally formed, wherein a reduction in the strength of the solid electrolyte fuel battery can be prevented, and a gas can be uniformly supplied to the inside of the cell.

A solid electrolyte fuel battery according to the present invention includes a battery structure part, an intercellular separation part, and a gas supply channel structure part. The battery structure part includes a plurality of cells, each of which is composed of an anode layer, a solid electrolyte layer and a cathode layer. The intercellular separation part is disposed between the plurality of cells and formed of a material containing ceramics. The gas supply channel structure part has an anode gas supply channel for supplying an anode gas to each of the plurality of cells and a cathode gas supply channel for supplying a cathode gas to each of the plurality of cells. The anode gas supply channel is composed of a first anode gas supply channel part, at least a part of the inner wall surface of which is formed of the anode layer, and a second anode gas supply channel part other than the first anode gas supply channel part. The cathode gas supply channel is composed of a first cathode gas supply channel part, at least a part of the inner wall surface of which is formed of the cathode layer, and a second cathode gas supply channel part other than the first cathode gas supply channel part. The first cross-section area of the first anode gas supply channel part is larger than the second cross-section area of at least a portion of the second anode gas supply channel part. The third cross-section area of the first cathode gas supply channel part is larger than the fourth cross-section area of at least a portion of the second cathode gas supply channel part.

In the solid electrolyte fuel battery of the present invention, the first cross-section area of the first anode gas supply channel part formed in the anode layer to which the anode gas is supplied, is larger than the second cross-section area of at least a part of the second anode gas supply channel part other than the first anode gas supply channel part, and the third cross-section area of the first cathode gas supply channel part formed in the cathode layer to which the cathode gas is supplied is larger than the fourth cross-section area of at least a part of the second cathode gas supply channel part other than the first cathode gas supply channel part. Therefore, the gas can be equally-distributed and supplied to the anode layer and the cathode layer through the first anode gas supply channel part and the first cathode gas supply channel part, which are formed in a cell and have a large cross-section area. Further, since at least parts of the second anode gas supply channel part and the second cathode gas supply channel part, which are respectively formed in a portion other than a cell, have a small cross-section area, it is possible to prevent the strength from being reduced due to formation of the supply channel in the solid electrolyte fuel battery in which a gas supply channel and a cell are integrally formed.

It is preferred that at least one of a ratio of the first cross-section area of the first anode gas supply channel part to the second cross-section area of at least a portion of the second anode gas supply channel part, and a ratio of the third cross-section area of the first cathode gas supply channel part to the fourth cross-section area of at least a portion of the second cathode gas supply channel part, is 1.1 or more and 14 or less.

It is more preferred that at least one of a ratio of the first cross-section area of the first anode gas supply channel part to the second cross-section area of at least a portion of the second anode gas supply channel part, and a ratio of the third cross-section area of the first cathode gas supply channel part to the fourth cross-section area of at least a portion of the second cathode gas supply channel part, is 2 or more and 10 or less.

At least one of the first anode gas supply channel part and the first cathode gas supply channel part preferably has a roughly rectangular cross-section.

At least one of the second anode gas supply channel part and the second cathode gas supply channel part preferably has a plurality of roughly circular cross-sections arranged at intervals.

In addition, the second anode gas supply channel part may be formed in the solid electrolyte layer, the cathode layer and the intercellular separation part.

The second cathode gas supply channel part is preferably formed in the anode layer, the solid electrolyte layer and the intercellular separation part.

The battery structure part, the intercellular separation part, and the gas supply channel structure part are preferably integrally formed.

As described above, in accordance with the present invention, since the cross-section areas of the gas supply channels formed in the anode layer and the cathode layer in a cell, respectively, to which gases are supplied, are made larger and the cross-section areas of at least parts of the gas supply channels formed in a portion other than a cell are made smaller, it is possible to prevent a reduction in the strength of the solid electrolyte fuel battery in which a gas supply channel and a cell are integrally formed, and it becomes possible to uniformly supply a gas to the inside of the cell.

DETAILED DESCRIPTION OF THE INVENTION

Hereinafter, embodiments of the present invention will be described based on drawings.

Figure 1:
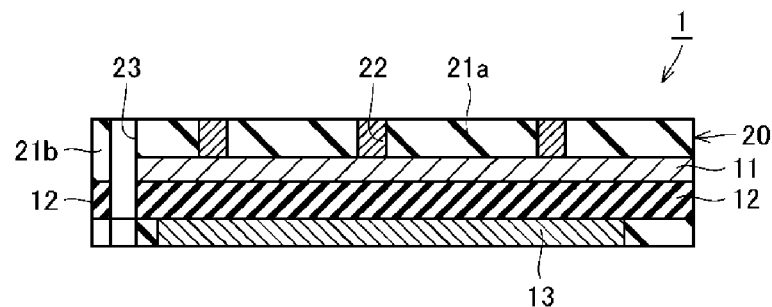
FIG. 1 is a sectional view showing a schematic constitution of a unit module of a solid electrolyte fuel battery as an embodiment or comparative embodiment of the present invention.
Figure 2:
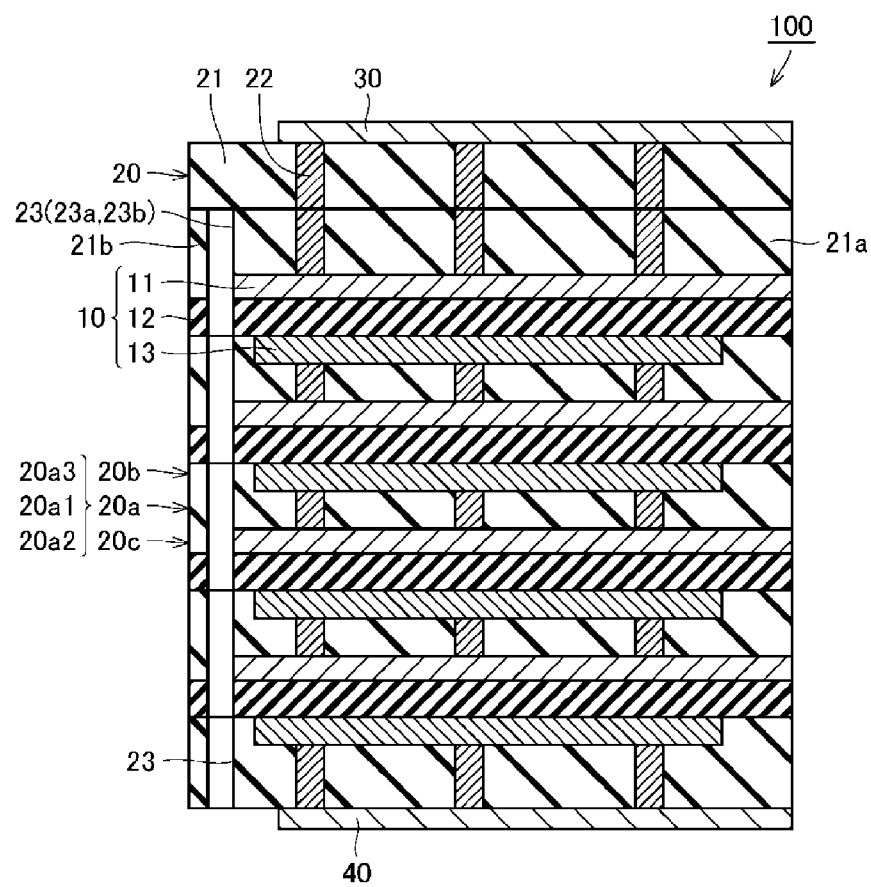
FIG. 2 is a sectional view showing a schematic constitution of the solid electrolyte fuel battery including a plurality of the unit modules of FIG. 1.

FIG. 1 is a sectional view showing a schematic constitution of a unit module of a solid electrolyte fuel battery as an embodiment of the present invention. FIG. 2 is a sectional view showing a schematic constitution of the solid electrolyte fuel battery including a plurality of the unit modules of FIG. 1.

As shown in FIG. 1, the unit module of a solid electrolyte fuel battery (solid electrolyte fuel battery module) 1 includes a solid electrolyte fuel battery support structure (hereinafter, referred to as a "support structure") 20. A fuel electrode layer 11 having a thickness of 100 to 300 μm as an anode layer, a solid electrolyte layer 12 having a thickness of 10 to 50 μm, and an air electrode layer 13 having a thickness of 100 to 300 μm as a cathode layer, respectively constituting a cell, are formed on the surface on one side of the support structure 20. A single battery structure part includes a cell composed of the fuel electrode layer 11, the solid electrolyte layer 12 and the air electrode layer 13. In addition, in FIG. 1, a fuel electrode layer 11, a solid electrolyte layer 12 and an air electrode layer 13 are formed in turn as the battery structure part on the surface on one side of the support structure 20 to configure a unit module; however, an air electrode layer 13, a solid electrolyte layer 12 and a fuel electrode layer 11 may be formed in turn to configure a unit module.

As shown in FIG. 2, the solid electrolyte fuel battery 100 has a plurality of cells 10 as a battery structure part, and a current collecting plate 30 having a thickness of 10 to 20 μm is arranged across the support structure 20 on a cell positioned at the uppermost section so as to be electrically connected, and a current collecting plate 40 having a thickness of 10 to 20 μm is arranged across the support structure 20 on a cell positioned at the lowermost section so as to be electrically connected. Each of a plurality of cells 10 includes a fuel electrode layer 11, a solid electrolyte layer 12, and an air electrode layer 13 which are laminated in turn. The support structure 20 is composed of an intercellular separation part 21a which is disposed between a plurality of cells 10, has a thickness of about 100 μm and made of a material containing ceramics, and a gas supply channel structure part 21b made of ceramics.

As shown in FIGS. 1 and 2, the intercellular separation part 21a is formed of an electrically insulating body 21 which separates a fuel gas as an anode gas supplied to each of a plurality of cells from air serving as an oxidant gas as a cathode gas, and a plurality of electrical conductors 22 which are formed in an electrically insulating body 21 and electrically connects a plurality of cells 10 to one another. The current collecting plate 30 is electrically connected to a fuel electrode layer 11 of an uppermost cell across the electrical conductor 22, and the current collecting plate 40 is electrically connected to an air electrode layer 13 of a lowermost cell across the electrical conductor 22.

Figure 3:
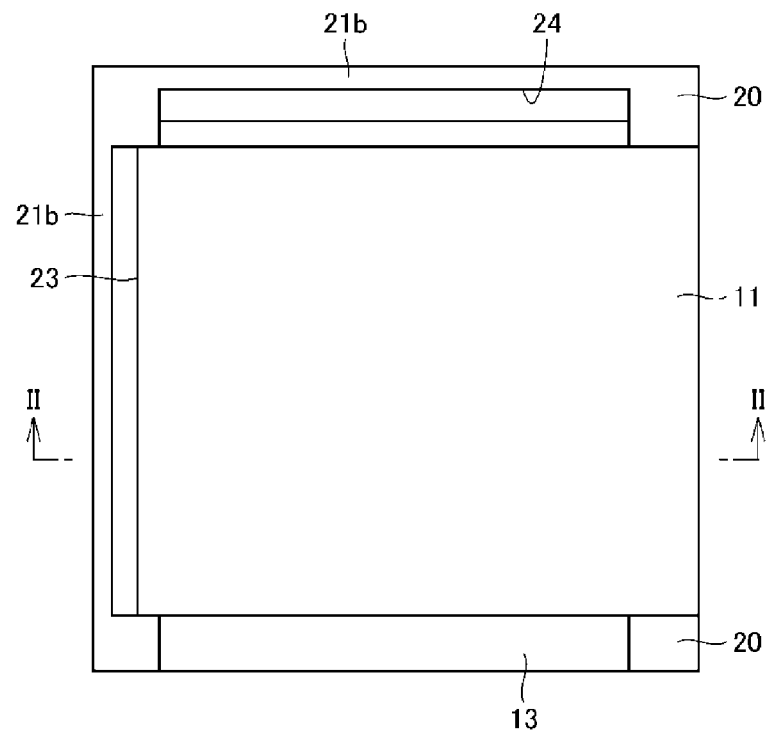
FIG. 3 is a plan view showing a schematic constitution of a unit module of a solid electrolyte fuel battery as Embodiment 1 of the present invention.

As shown in FIGS. 1, 2 and 3, a main body of the gas supply channel structure part 21b, that is, a wall part forming the fuel gas supply channel 23 and the air supply channel 24 is made of ceramics and composed of the same electrically insulating body as the electrically insulating body 21 forming the intercellular separation part 21a, and the main body and the electrically insulating body 21 forming the intercellular separation part 21a are continuously formed. That is, the gas supply channel structure part 21b and the intercellular separation part 21a are integrally formed. Further, the gas supply channel structure part 21b and a plurality of cells 10 as the battery structure part are integrally formed. Moreover, the intercellular separation part 21a and a plurality of cells 10 are integrally formed.

In addition, the electrically insulating body 21 is formed by using, for example, zirconia ($ZrO_2$) stabilized with yttria ($Y_2O_3$) added in an amount 3 mole % (yttria stabilized zirconia: YSZ), zirconia ($ZrO_2$) stabilized with ceria ($CeO_2$) added in an amount 12 mole % (ceria stabilized zirconia: CeSZ) or the like. The electrical conductor 22 is formed by using, for example, a silver (Ag)-platinum (Pt) alloy, a silver (Ag)-palladium (Pd) alloy or the like. The solid electrolyte layer 12 is formed by using, for example, zirconia ($ZrO_2$) stabilized with scandia ($Sc_2O_3$) added in an amount 10 mole % and ceria ($CeO_2$) added in an amount 1 mole % (scandia ceria stabilized zirconia: ScCeSZ), zirconia ($ZrO_2$) stabilized with scandia ($Sc_2O_3$) added in an amount 11 mole % (scandia stabilized zirconia: ScSZ) or the like. The fuel electrode layer 11 is formed by using, for example, a mixture of nickel oxide (NiO) and zirconia ($ZrO_2$) stabilized with scandia ($Sc_2O_3$) added in an amount 10 mole % and ceria ($CeO_2$) added in an amount 1 mole % (scandia ceria stabilized zirconia: ScCeSZ) or the like. The air electrode layer 13 is formed by using, for example, a mixture of $La_{0.8}Sr_{0.2}MnO_3$ and zirconia ($ZrO_2$) stabilized with scandia ($Sc_2O_3$) added in an amount 10 mole % and ceria ($CeO_2$) added in an amount 1 mole % (scandia ceria stabilized zirconia: ScCeSZ) or the like. The current collecting plates 30 and 40 are formed of, for example, silver (Ag).

Embodiment 1

FIG. 3 is a plan view showing a schematic constitution of the unit module of FIG. 1. A cross-section taken on line II-II of FIG. 3 corresponds to FIGS. 1 and 2.

As shown in FIG. 3, a single cell constituting the battery structure part includes a fuel electrode layer 11 and an air electrode layer 13. Although not shown, a solid electrolyte layer is interposed between a fuel electrode layer 11 and an air electrode layer 13. In the gas supply channel structure part 21b which is a part of the support structure 20, one fuel gas supply channel 23 as an anode gas supply channel for supplying a fuel gas to the cell and one air supply channel 24 as a cathode gas supply channel for supplying air to the cell are formed. Each of the fuel gas supply channel 23 and the air supply channel 24 is formed in the form of an opening which extends in one direction, that is, a long and thin through-hole. In other words, each of the fuel gas supply channel 23 and the air supply channel 24 has a roughly rectangular cross-section.

The fuel gas supply channel 23 is arranged so as to be in contact with a side surface on one side (left side in FIG. 3) of the fuel electrode layer 11. The air supply channel 24 is arranged so as to be in contact with a side surface on one side (upper side in FIG. 3) of the air electrode layer 13. That is, the fuel gas supply channel 23 shown in FIG. 3 corresponds to a first anode gas supply channel part, at least a part of the inner wall surface of which is formed of the fuel electrode layer 11. Further, the air supply channel 24 shown in FIG. 3 corresponds to a first cathode gas supply channel part, at least a part of the inner wall surface of which is formed of the air electrode layer 13.

In FIG. 3, the fuel gas flows rightward from the fuel gas supply channel 23 arranged on a left side to the fuel electrode layer 11. The air flows downward from the air supply channel 24 arranged on an upper side to the air electrode layer 13. As described above, in the solid electrolyte fuel battery 100 of Embodiment 1, a stream of a fuel gas and a stream of air are orthogonal to each other. The fuel gas supply channel 23 and the air supply channel 24 are arranged at the outside of the battery structure part.

As shown in FIG. 2, the support structure 20 is composed of a laminate of a portion 20b, a portion 20a and a portion 20c. The portion 20a is composed of a laminate of a portion 20a3, a portion 20a1 and a portion 20a2. The portion 20a1 has a shape shown in FIG. 4, the portion 20a2 has a shape shown in FIG. 5, and the portion 20a3 has a shape shown in FIG. 6. The portion 20b has a shape shown in FIG. 7, and the air supply channel 24 is formed by fitting the air electrode layer 13 shown in FIG. 11 in the portion 20b. The portion 20c has a shape shown in FIG. 8, and the fuel gas supply channel 23 is formed by fitting the fuel electrode layer 11 shown in FIG. 9 in the portion 20c. As shown in FIG. 10, the fuel gas supply channel 23 and the air supply channel 24 are formed in the solid electrolyte layer 12.

Figure 4:
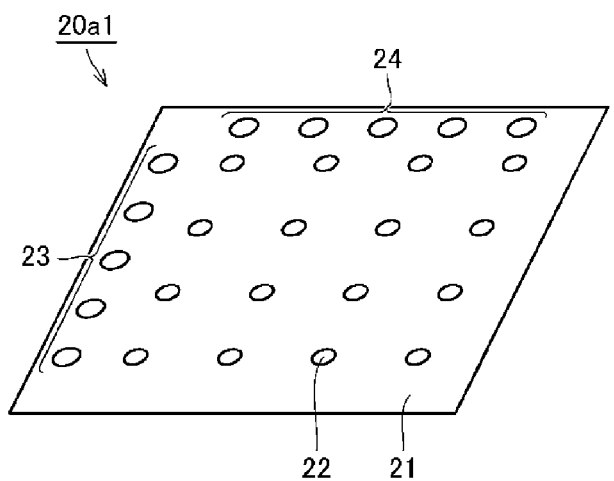
FIG. 4 is a perspective view showing a part of a support structure including an intercellular separation part, an anode gas supply channel, and a cathode gas supply channel of Embodiment 1 of the present invention.

As shown in FIGS. 2 and 4, in the portion 20a1 of the support structure 20 which is not in contact with the fuel electrode layer 11 nor the air electrode layer 13, each of the fuel gas supply channel 23 and the air supply channel 24 is formed in the form of a plurality of openings which are arranged at intervals in one direction, that is, a plurality of circular through-holes. That is, each of the fuel gas supply channel 23 and the air supply channel 24 has a plurality of roughly circular cross-sections arranged at intervals.

Figure 5:
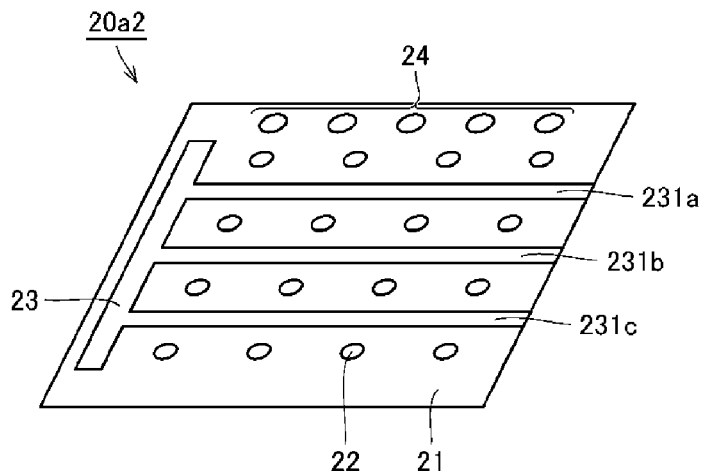
FIG. 5 is a perspective view showing a part of a support structure including an intercellular separation part, an anode gas supply channel and an anode gas distribution channel, and a cathode gas supply channel of Embodiment 1 of the present invention.

As shown in FIGS. 2 and 5, in the portion 20a2 of the support structure 20 in contact with the fuel electrode layer 11, the fuel gas supply channel 23 has a roughly rectangular cross-section, and the air supply channel 24 has a plurality of roughly circular cross-sections arranged at intervals. In addition, the fuel gas distribution channel forming layers 231a, 231b and 231c disappear after firing, and thereby, these layers become fuel gas distribution channels which lead to a fuel gas supply channel 23 for supplying a fuel gas to the fuel electrode layer 11 and distribute a fuel gas to the fuel electrode layer 11. A portion between the fuel gas distribution channel forming layers 231a, 231b and 231c is a portion which forms a wall of fuel gas distribution channels, and the portion is referred to as a rib.

Figure 6:
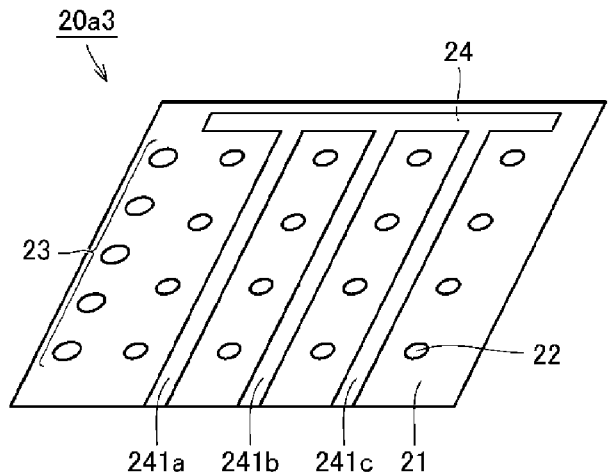
FIG. 6 is a perspective view showing a part of a support structure including an intercellular separation part, an anode gas supply channel, and a cathode gas supply channel and a cathode gas distribution channel of Embodiment 1 of the present invention.

As shown in FIGS. 2 and 6, in the portion 20a3 of the support structure 20 in contact with the air electrode layer 13, the air supply channel 24 has a roughly rectangular cross-section, and the fuel gas supply channel 23 has a plurality of roughly circular cross-sections arranged at intervals. In addition, the air distribution channel forming layers 241a, 241b and 241c disappear after firing, and thereby, these layers become air distribution channels which lead to an air supply channel 24 for supplying air to the fuel electrode layer 13 and distribute air to the air electrode layer 13. A portion between the air distribution channel forming layers 241a, 241b and 241c is a portion which forms a wall of air distribution channels, and the portion is referred to as a rib.

Figure 7:
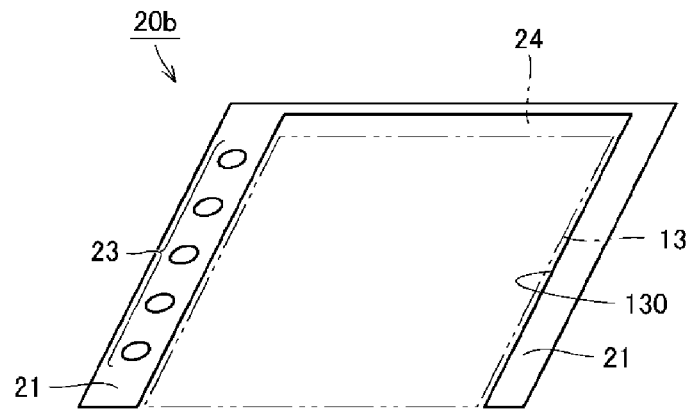
FIG. 7 is a perspective view showing a part of a support structure including an anode gas supply channel of Embodiment 1 of the present invention.

As shown in FIGS. 2 and 7, in the portion 20b of the support structure 20 in contact with the air electrode layer 13, the air supply channel 24 has a roughly rectangular cross-section, and the fuel gas supply channel 23 has a plurality of roughly circular cross-sections arranged at intervals. In addition, in the air supply channel 24, at least a part of the inner wall surface is formed of the air electrode layer 13.

Figure 8:
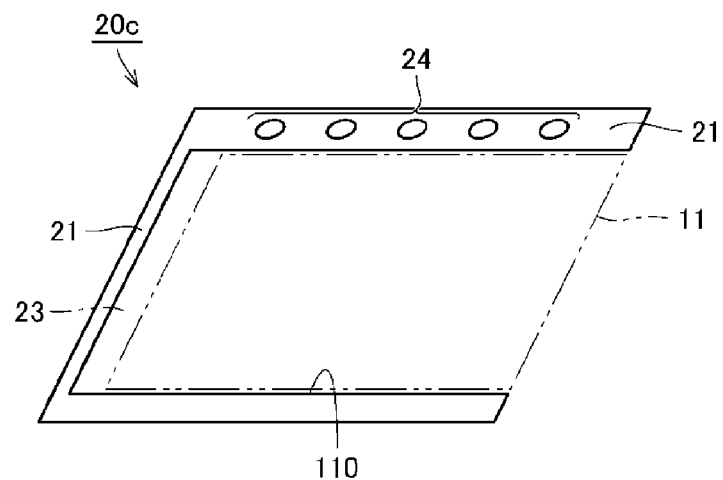
FIG. 8 is a perspective view showing a part of a support structure including a cathode gas supply channel of Embodiment 1 of the present invention.

As shown in FIGS. 2 and 8, in the portion 20c of the support structure 20 in contact with the fuel electrode layer 11, the fuel gas supply channel 23 has a roughly rectangular cross-section, and the air supply channel 24 has a plurality of roughly circular cross-sections arranged at intervals. In addition, in the fuel gas supply channel 23, at least a part of the inner wall surface is formed of the fuel electrode layer 11.

As shown in FIG. 10, in the solid electrolyte layer 12, each of the fuel gas supply channel 23 and the air supply channel 24 has a plurality of roughly circular cross-sections arranged at intervals.

The fuel gas supply channel 23 shown in FIG. 8 corresponds to a first anode gas supply channel part, at least a part of the inner wall surface of which is formed of the fuel electrode layer 11, and the air supply channel 24 shown in FIG. 7 corresponds to a first cathode gas supply channel part, at least a part of the inner wall surface of which is formed of the air electrode layer 13. The fuel gas supply channel 23 shown in FIGS. 4, 6, 7 and 10 corresponds to at least a part of the second anode gas supply channel part other than the first anode gas supply channel part. The air supply channel 24 shown in FIGS. 4, 5, 8 and 10 corresponds to at least a part of the second cathode gas supply channel part other than the first cathode gas supply channel part.

Since the above-mentioned constitution is used, the first cross-section area (an area of a roughly rectangular cross-section) of the fuel gas supply channel 23 (the first anode gas supply channel part) shown in FIG. 8 is larger than the second cross-section area (total areas of roughly circular cross-sections) of the fuel gas supply channel 23 (at least a part of the second anode gas supply channel part) shown in FIGS. 4, 6, 7 and 10. The third cross-section area (an area of a roughly rectangular cross-section) of the air supply channel 24 (the first cathode gas supply channel part) shown in FIG. 7 is larger than the fourth cross-section area (total areas of roughly circular cross-sections) of the air supply channel 24 (at least a part of the second cathode gas supply channel part) shown in FIGS. 4, 5, 8 and 10.

Accordingly, in the solid electrolyte fuel battery 100 of Embodiment 1, the first cross-section area of the fuel gas supply channel 23 formed in the fuel electrode layer 11 to which the fuel gas is supplied, is larger than the second cross-section area of at least a part of the fuel gas supply channel 23 other than the above-mentioned fuel gas supply channel 23, and the third cross-section area of the air supply channel 24 formed in the air electrode layer 13 to which the air is supplied, is larger than the fourth cross-section area of at least a part of the air supply channel 24 other than the above-mentioned air supply channel 24. Therefore, the gas can be equally-distributed and supplied to the fuel electrode layer 11 and the air electrode layer 13 through the fuel gas supply channel 23 and the air supply channel 24, which are formed in a cell and have a large cross-section area. Further, since at least parts of the fuel gas supply channel 23 and the air supply channel 24, which are respectively formed in a portion other than a cell, have a small cross-section area, it is possible to prevent the strength from being reduced due to formation of the supply channel in the solid electrolyte fuel battery 100 in which a gas supply channel and a cell are integrally formed.

It is preferred that at least one of a ratio of the first cross-section area of the fuel gas supply channel 23 formed in a cell to the second cross-section area of at least a part of the fuel gas supply channel 23 formed in a portion other than a cell, and a ratio of the third cross-section area of the air supply channel 24 formed in a cell to the fourth cross-section area of at least a part of the air supply channel 24 formed in a portion other than a cell, is 1.1 or more and 14 or less. When the ratio is more than 1.1, the strength of the cell is increased. When the ratio is less than 14, the effect of a pressure loss on the channel is small, and a gas can be evenly flown in the channel.

It is more preferred that at least one of a ratio of the first cross-section area of the fuel gas supply channel 23 formed in a cell to the second cross-section area of at least a part of the fuel gas supply channel 23 formed in a portion other than a cell, and a ratio of the third cross-section area of the air supply channel 24 formed in a cell to the fourth cross-section area of at least a part of the air supply channel 24 formed in a portion other than a cell, is 2 or more and 10 or less. When the ratio is more than 2, the strength of the cell is adequately increased. When the ratio is less than 10, the effect of a pressure loss on the channel can be substantially neglected.

In addition, in Embodiment 1, not only the cross-section area of the fuel gas supply channel 23, at least a part of the inner wall surface of which is formed of the fuel electrode layer 11, as shown in FIG. 8, but also the cross-section area (an area of a roughly rectangular cross-section) of the fuel gas supply channel 23 formed in the portions 20a2 and 20c of the support structure 20 in contact with the fuel electrode layer 11, as shown in FIGS. 5 and 8, is larger than the cross-section area (total areas of roughly circular cross-sections) of the fuel gas supply channel 23 shown in FIGS. 4, 6, 7 and 10. Not only the cross-section area of the air supply channel 24, at least a part of the inner wall surface of which is formed of the air electrode layer 13, as shown in FIG. 7, but also the cross-section area (an area of a roughly rectangular cross-section) of the air supply channel 24 formed in the portions 20a3 and 20b of the support structure 20 in contact with the air electrode layer 13, as shown in FIGS. 6 and 7, is larger than the cross-section area (total areas of roughly circular cross-sections) of the air supply channel 24 (at least a part of the second cathode gas supply channel part) shown in FIGS. 4, 5, 8 and 10.

Embodiment 2

Figure 12:
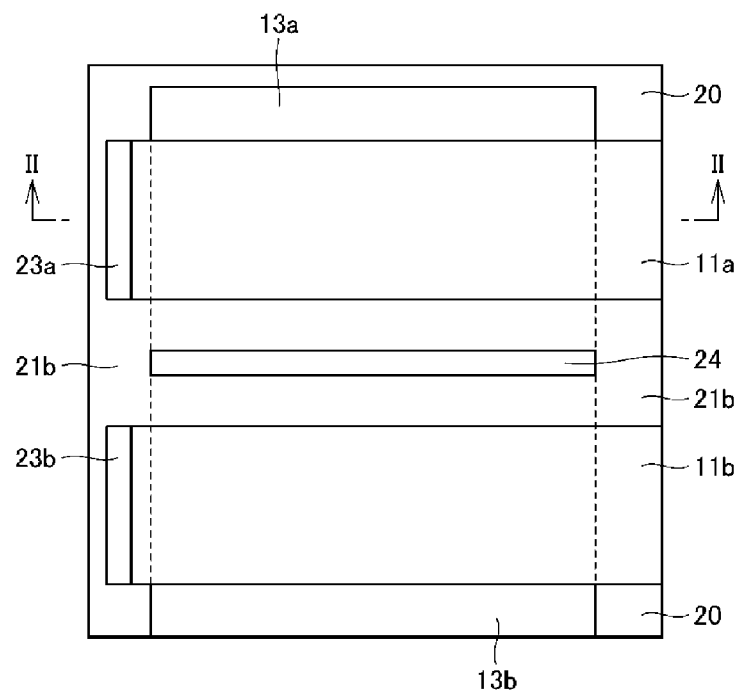
FIG. 12 is a plan view showing a schematic constitution of a unit module of a solid electrolyte fuel battery as Embodiment 2 of the present invention.

FIG. 12 is a plan view showing a schematic constitution of the unit module of FIG. 1. A cross-section taken on line II-II of FIG. 12 corresponds to FIGS. 1 and 2.

As shown in FIG. 12, a single cell constituting the battery structure part includes two fuel electrode layers 11a and 11b and two air electrode layers 13a and 13b. Although not shown, a solid electrolyte layer is interposed between two fuel electrode layers 11a, 11b and two air electrode layers 13a, 13b. In the gas supply channel structure part 21b which is a part of the support structure 20, two fuel gas supply channels 23a and 23b as an anode gas supply channel for supplying a fuel gas to the cell and one air supply channel 24 as an cathode gas supply channel for supplying air to the cell are formed. Each of the fuel gas supply channels 23a, 23b and the air supply channel 24 is formed in the form of an opening which extends in one direction, that is, a long and thin through-hole. In other words, each of the fuel gas supply channels 23a and 23b and the air supply channel 24 has a roughly rectangular cross-section.

The fuel gas supply channel 23a is arranged so as to be in contact with a side surface on one side (left side in FIG. 12) of the fuel electrode layer 11a, and the fuel gas supply channel 23b is arranged so as to be in contact with a side surface on one side (left side in FIG. 12) of the fuel electrode layer 11b. The air supply channel 24 is interposed between the air electrode layer 13a and the air electrode layer 13b, and arranged so as to be in contact with a side surface on one side (lower side in FIG. 12) of the air electrode layer 13a, and arranged so as to be in contact with a side surface on one side (upper side in FIG. 12) of the air electrode layer 13b. Because of this arrangement, the air supply channel 24 is arranged within the battery structure part.

The fuel gas supply channels 23a and 23b shown in FIG. 12 corresponds to a first anode gas supply channel part, at least a part of the inner wall surface of which is formed of the fuel electrode layer 11. Further, the air supply channel 24 shown in FIG. 12 corresponds to a first cathode gas supply channel part, at least a part of the inner wall surface of which is formed of the air electrode layer 13.

In FIG. 12, the fuel gas flows rightward from the fuel gas supply channels 23a and 23b arranged on a left side to the fuel electrode layers 11a and 11b, respectively. The air flows upward from the air supply channel 24 arranged within or in the central part of the battery structure part to the air electrode layer 13a, and flows downward from the air supply channel 24 to the air electrode layer 13b. As described above, in the solid electrolyte fuel battery 100 of Embodiment 2, a stream of a fuel gas and a stream of air are orthogonal to each other.

Figure 13:
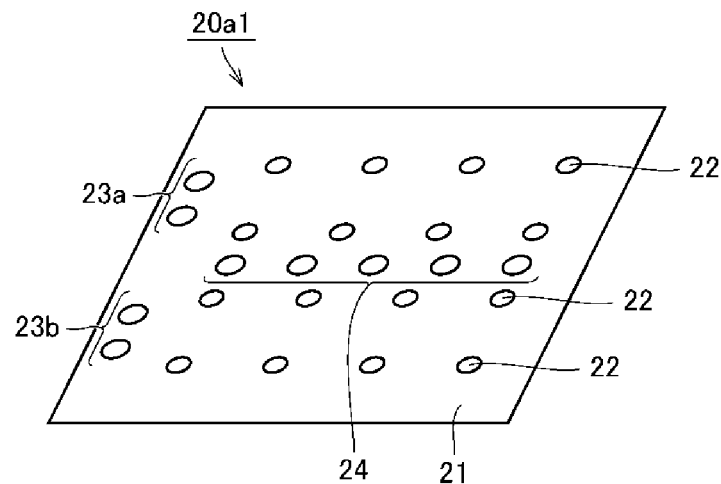
FIG. 13 is a perspective view showing a part of a support structure including an intercellular separation part, an anode gas supply channel, and a cathode gas supply channel of Embodiment 2 of the present invention.
Figure 14:
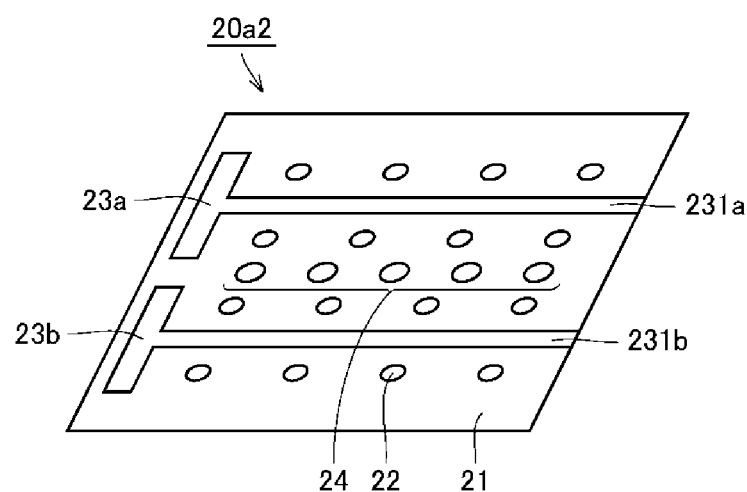
FIG. 14 is a perspective view showing a part of a support structure including an intercellular separation part, an anode gas supply channel and an anode gas distribution channel, and a cathode gas supply channel of Embodiment 2 of the present invention.
Figure 15:
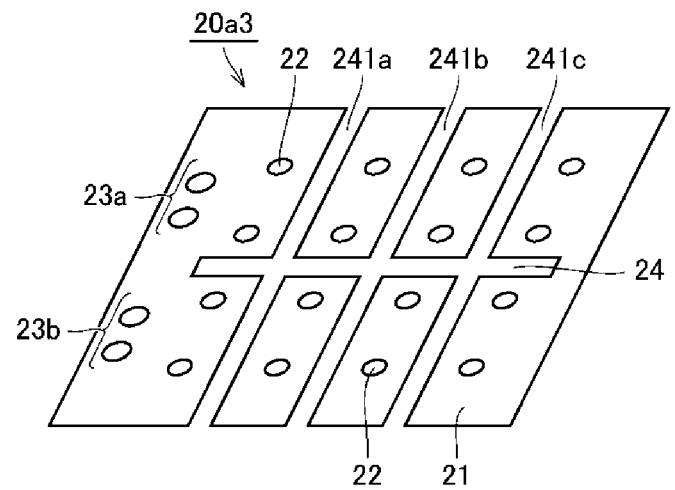
FIG. 15 is a perspective view showing a part of a support structure including an intercellular separation part, an anode gas supply channel, and a cathode gas supply channel and a cathode gas distribution channel of Embodiment 2 of the present invention.
Figure 18:
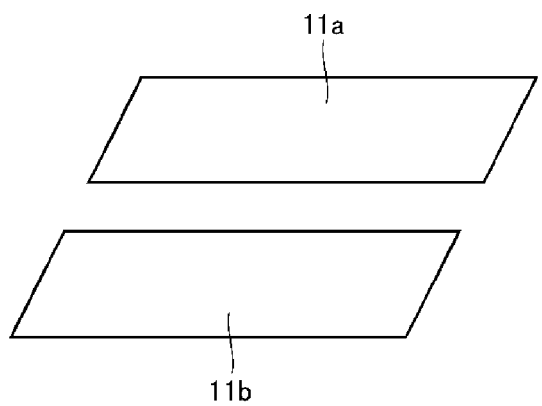
FIG. 18 is a perspective view showing a fuel electrode layer of Embodiment 2 of the present invention.
Figure 19:
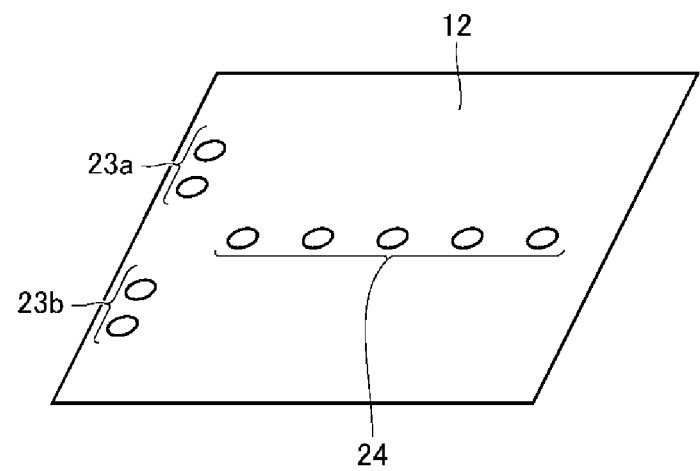
FIG. 19 is a perspective view showing a solid electrolyte layer of Embodiment 2 of the present invention.
Figure 20:
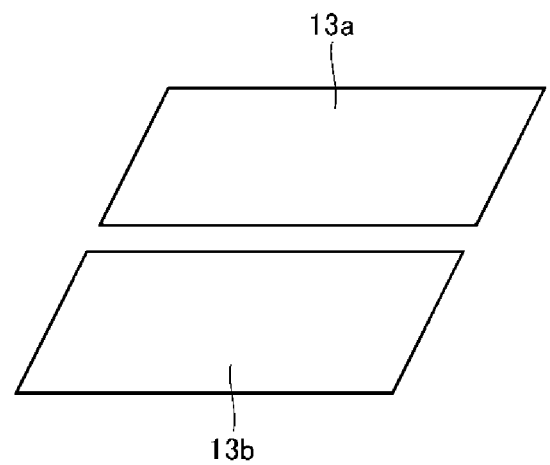
FIG. 20 is a perspective view showing an air electrode layer of Embodiment 2 of the present invention.

The portion 20a1 has a shape shown in FIG. 13, the portion 20a2 has a shape shown in FIG. 14, and the portion 20a3 has a shape shown in FIG. 15. The portion 20b has a shape shown in FIG. 16, and the air supply channel 24 is formed by fitting the air electrode layers 13a and 13b shown in FIG. 20 in the portion 20b. The portion 20c has a shape shown in FIG. 17, and the fuel gas supply channels 23a and 23b are formed by fitting the fuel electrode layers 11a and 11b shown in FIG. 18 in the portion 20c. As shown in FIG. 19, the fuel gas supply channels 23a and 23b, and the air supply channel 24 are formed in the solid electrolyte layer 12.

As shown in FIGS. 2 and 13, in the portion 20a1 of the support structure 20 which is not in contact with the fuel electrode layer 11 nor the air electrode layer 13, each of the fuel gas supply channels 23a, 23b and the air supply channel 24 is formed in the form of a plurality of openings which are arranged at intervals in one direction, that is, a plurality of circular through-holes. That is, each of the fuel gas supply channels 23a and 23b, and the air supply channel 24 has a plurality of roughly circular cross-sections arranged at intervals.

As shown in FIGS. 2 and 14, in the portion 20a2 of the support structure 20 in contact with the fuel electrode layer 11, each of the fuel gas supply channels 23a and 23b has a roughly rectangular cross-section, and the air supply channel 24 has a plurality of roughly circular cross-sections arranged at intervals. In addition, the fuel gas distribution channel forming layers 231a and 231b disappear after firing, and thereby, these layers become fuel gas distribution channels which lead to a fuel gas supply channel 23 for supplying a fuel gas to the fuel electrode layer 11 and distribute a fuel gas to the fuel electrode layer 11. A portion between the fuel gas distribution channel forming layers 231a and 231b is a portion which forms a wall of fuel gas distribution channels, and the portion is referred to as a rib.

As shown in FIGS. 2 and 15, in the portion 20a3 of the support structure 20 in contact with the air electrode layer 13, the air supply channel 24 has a roughly rectangular cross-section, and each of the fuel gas supply channels 23a and 23b has a plurality of roughly circular cross-sections arranged at intervals. In addition, the air distribution channel forming layers 241a, 241b and 241c disappear after firing, and thereby, these layers become air distribution channels which lead to an air supply channel 24 for supplying air to the air electrode layer 13 and distribute air to the air electrode layer 13. A portion between the air distribution channel forming layers 241a, 241b and 241c is a portion which forms a wall of air distribution channels, and the portion is referred to as a rib.

Figure 16:
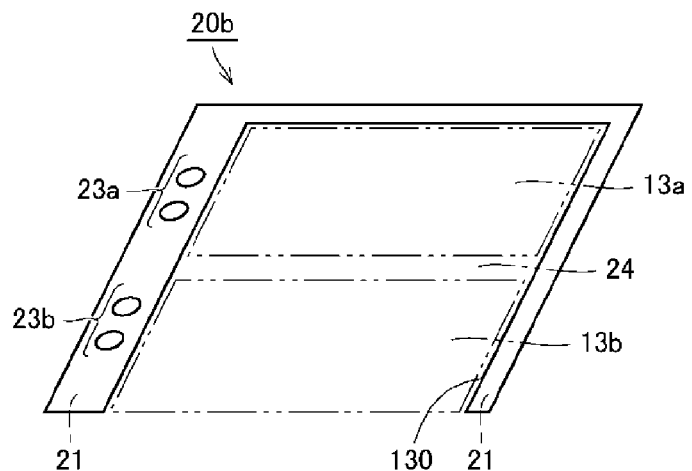
FIG. 16 is a perspective view showing a part of a support structure including an anode gas supply channel of Embodiment 2 of the present invention.

As shown in FIGS. 2 and 16, in the portion 20b of the support structure 20 in contact with the air electrode layers 13a and 13b, the air supply channel 24 has a roughly rectangular cross-section, and each of the fuel gas supply channels 23a and 23b has a plurality of roughly circular cross-sections arranged at intervals. In addition, in the air supply channel 24, at least a part of the inner wall surface is formed of the air electrode layers 13a and 13b.

Figure 17:
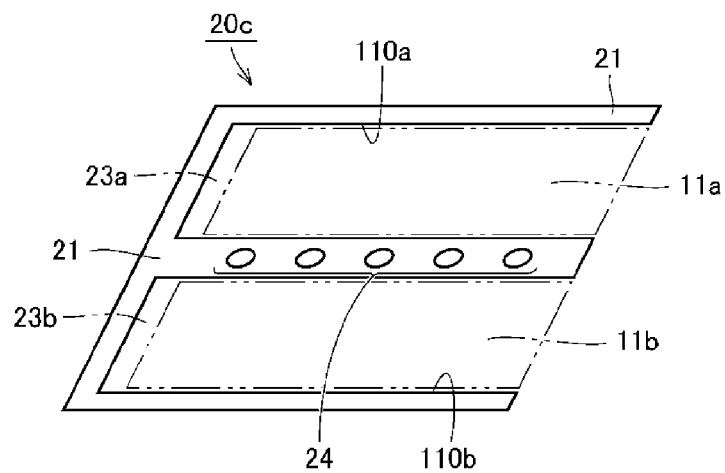
FIG. 17 is a perspective view showing a part of a support structure including a cathode gas supply channel of Embodiment 2 of the present invention.

As shown in FIGS. 2 and 17, in the portion 20c of the support structure 20 in contact with the fuel electrode layers 11a and 11b, each of the fuel gas supply channels 23a and 23b has a roughly rectangular cross-section, and the air supply channel 24 has a plurality of roughly circular cross-sections arranged at intervals. In addition, in the fuel gas supply channels 23a and 23b, at least parts of the inner wall surfaces are formed of the fuel electrode layers 11a and 11b.

As shown in FIG. 19, in the solid electrolyte layer 12, each of the fuel gas supply channels 23a and 23b, and the air supply channel 24 has a plurality of roughly circular cross-sections arranged at intervals.

The fuel gas supply channels 23a and 23b shown in FIG. 17 correspond to first anode gas supply channel parts, at least parts of the inner wall surfaces of which are formed of the fuel electrode layers 11a and 11b, and the air supply channel 24 shown in FIG. 16 corresponds to a first cathode gas supply channel part, at least a part of the inner wall surface of which is formed of the air electrode layers 13a and 13b. The fuel gas supply channels 23a and 23b shown in FIGS. 13, 15, 16 and 19 correspond to at least a part of the second anode gas supply channel part other than the first anode gas supply channel part. The air supply channel 24 shown in FIGS. 13, 14, 17 and 19 corresponds to at least a part of the second cathode gas supply channel part other than the first cathode gas supply channel part.

Since the above-mentioned constitution is used, the first cross-section areas (total areas of roughly rectangular cross-sections) of the fuel gas supply channels 23a and 23b (the first anode gas supply channel part) shown in FIG. 17 are larger than the second cross-section areas (total areas of roughly circular cross-sections) of the fuel gas supply channels 23a and 23b (at least a part of the second anode gas supply channel part) shown in FIGS. 13, 15, 16 and 19. The third cross-section area (an area of a roughly rectangular cross-section) of the air supply channel (the first cathode gas supply channel part) shown in FIG. 16 is larger than the fourth cross-section area (total areas of roughly circular cross-sections) of the air supply channel 24 (at least a part of the second cathode gas supply channel part) shown in FIGS. 13, 14, 17 and 19.

Accordingly, the solid electrolyte fuel battery 100 of Embodiment 2 can achieve the same operation and effect as in Embodiment 1 described above.

It is preferred that at least one of a ratio of the first cross-section area of the fuel gas supply channel 23a, 23b formed in a cell to the second cross-section area of at least a part of the fuel gas supply channel 23a, 23b formed in a portion other than a cell, and a ratio of the third cross-section area of the air supply channel 24 formed in a cell to the fourth cross-section area of at least a part of the air supply channel 24 formed in a portion other than a cell, is 1.1 or more and 14 or less. It is more preferred that at least one of a ratio of the first cross-section area of the fuel gas supply channel 23a, 23b formed in a cell to the second cross-section area of at least a part of the fuel gas supply channel 23a, 23b formed in a portion other than a cell, and a ratio of the third cross-section area of the air supply channel 24 formed in a cell to the fourth cross-section area of at least a part of the air supply channel 24 formed in a portion other than a cell, is 2 or more and 10 or less. Also in this case, the same operation and effect as in Embodiment 1 described above can be achieved.

In addition, in Embodiment 2, not only the cross-section areas of the fuel gas supply channels 23a and 23b, at least parts of the inner wall surfaces of which are formed of the fuel electrode layers 11a and 11b, as shown in FIG. 17, but also the cross-section areas (total areas of roughly rectangular cross-sections) of the fuel gas supply channels 23a and 23b respectively formed in the portions 20a2 and 20c of the support structure 20 in contact with the fuel electrode layers 11a and 11b, as shown in FIGS. 14 and 17, are larger than the cross-section areas (total areas of roughly circular cross-sections) of the fuel gas supply channels 23a and 23b shown in FIGS. 13, 15, 16 and 19. Not only the cross-section area of the air supply channel 24, at least a part of the inner wall surface of which is formed of the air electrode layers 13a and 13b, as shown in FIG. 16, but also the cross-section area (an area of a roughly rectangular cross-section) of the air supply channel 24 formed in the portions 20a3 and 20b of the support structure 20 in contact with the air electrode layers 13a and 13b, as shown in FIGS. 15 and 16, is larger than the cross-section area (total areas of roughly circular cross-sections) of the air supply channel 24 (at least a part of the second cathode gas supply channel part) shown in FIGS. 13, 14, 17 and 19.

Embodiment 3

Figure 21:
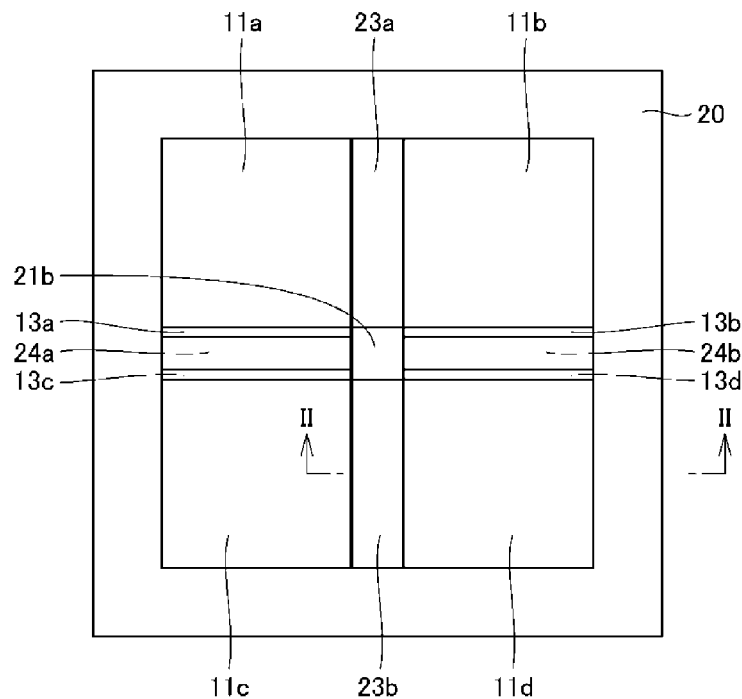
FIG. 21 is a plan view showing a schematic constitution of a unit module of a solid electrolyte fuel battery as Embodiment 3 of the present invention.

FIG. 21 is a plan view showing a schematic constitution of the unit module of FIG. 1. A cross-section taken on line II-II of FIG. 21 corresponds to FIGS. 1 and 2.

As shown in FIG. 21, a single cell constituting the battery structure part includes four fuel electrode layers 11a, 11b, 11c and 11d and four air electrode layers 13a, 13b, 13c and 13d. Although not shown, a solid electrolyte layer is interposed between four fuel electrode layers 11a, 11b, 11c, 11d and four air electrode layers 13a, 13b, 13c, 13d. In the gas supply channel structure part 21b which is a part of the support structure 20, two fuel gas supply channels 23a and 23b as an anode gas supply channel for supplying a fuel gas to the cell and two air supply channels 24a and 24b as an cathode gas supply channel for supplying air to the cell are formed. Each of the fuel gas supply channels 23a, 23b and the air supply channels 24a, 24b is formed in the form of an opening which extends in one direction, that is, a long and thin through-hole. In other words, each of the fuel gas supply channels 23a and 23b and the air supply channels 24a and 24b has a roughly rectangular cross-section.

The fuel gas supply channel 23a is interposed between the fuel electrode layer 11a and the fuel electrode layer 11b, and arranged so as to be in contact with a side surface on one side (right side in FIG. 21) of the fuel electrode layer 11a, and arranged so as to be in contact with a side surface on one side (left side in FIG. 21) of the fuel electrode layer 11b. The fuel gas supply channel 23b is interposed between the fuel electrode layer 11c and the fuel electrode layer 11d, and arranged so as to be in contact with a side surface on one side (right side in FIG. 21) of the fuel electrode layer 11c, and arranged so as to be in contact with a side surface on one side (left side in FIG. 21) of the fuel electrode layer 11d. Because of this arrangement, the fuel gas supply channel 23 is arranged within the battery structure part.

The air supply channel 24a is interposed between the air electrode layer 13a and the air electrode layer 13b, and arranged so as to be in contact with a side surface on one side (lower side in FIG. 21) of the air electrode layer 13a, and arranged so as to be in contact with a side surface on one side (upper side in FIG. 21) of the air electrode layer 13c. The air supply channel 24b is interposed between the air electrode layer 13b and the air electrode layer 13d, and arranged so as to be in contact with a side surface on one side (lower side in FIG. 21) of the air electrode layer 13b, and arranged so as to be in contact with a side surface on one side (upper side in FIG. 21) of the air electrode layer 13d. Because of this arrangement, the air supply channel 24 is arranged within the battery structure part.

The fuel gas supply channels 23a and 23b shown in FIG. 21 correspond to first anode gas supply channel parts, at least parts of the inner wall surfaces of which are formed of the fuel electrode layer 11. Further, the air supply channel 24 shown in FIG. 21 corresponds to a first cathode gas supply channel part, at least a part of the inner wall surface of which is formed of the air electrode layer 13.

In FIG. 21, the fuel gas flows rightward and leftward from each of the fuel gas supply channels 23a and 23b arranged within or in the central part of the battery structure part to each of the fuel electrode layers 11a, 11b, 11c and 11d. The air flows upward and downward from each of the air supply channels 24a and 24b arranged within or in the central part of the battery structure part to each of the air electrode layers 13a, 13b, 13c and 13d. As described above, in the solid electrolyte fuel battery 100 of Embodiment 3, a stream of a fuel gas and a stream of air are orthogonal to each other.

Figure 22:
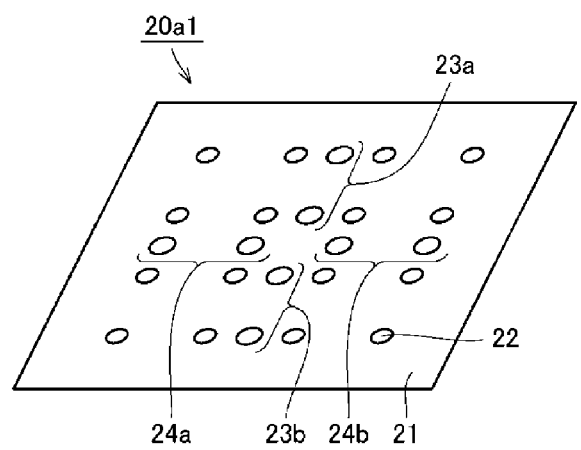
FIG. 22 is a perspective view showing a part of a support structure including an intercellular separation part, an anode gas supply channel, and a cathode gas supply channel of Embodiment 3 of the present invention.
Figure 23:
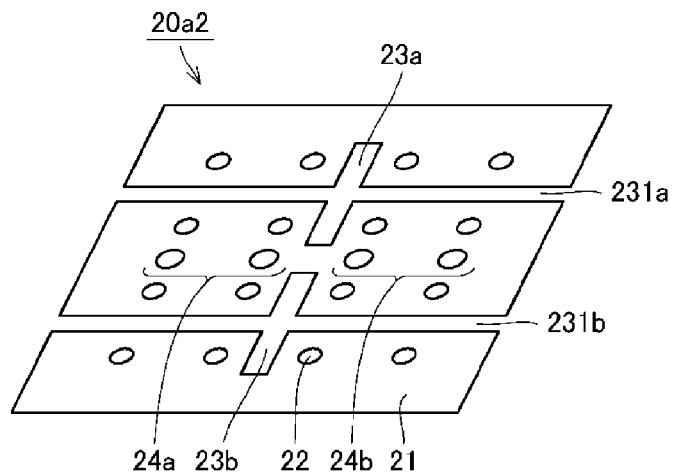
FIG. 23 is a perspective view showing a part of a support structure including an intercellular separation part, an anode gas supply channel and an anode gas distribution channel, and a cathode gas supply channel of Embodiment 3 of the present invention.
Figure 24:
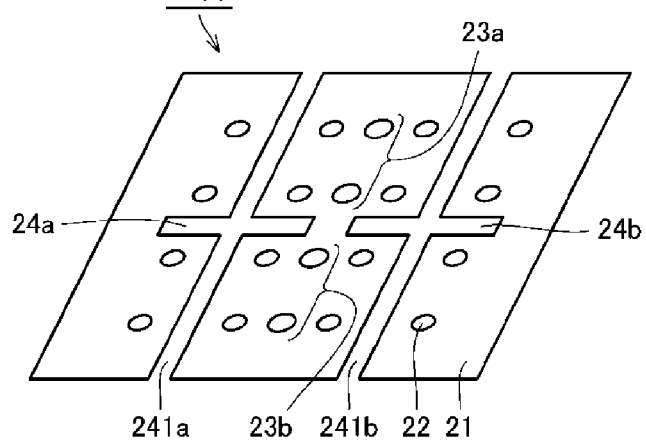
FIG. 24 is a perspective view showing a part of a support structure including an intercellular separation part, an anode gas supply channel, and a cathode gas supply channel and a cathode gas distribution channel of Embodiment 3 of the present invention.
Figure 27:
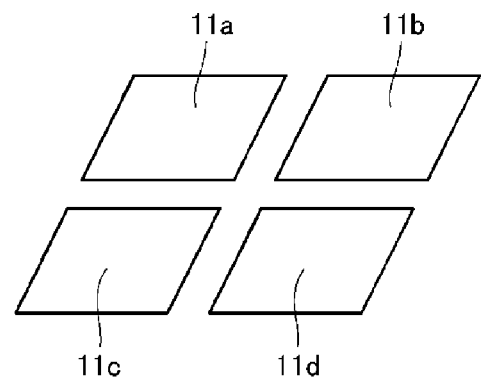
FIG. 27 is a perspective view showing a fuel electrode layer of Embodiment 3 of the present invention.
Figure 28:
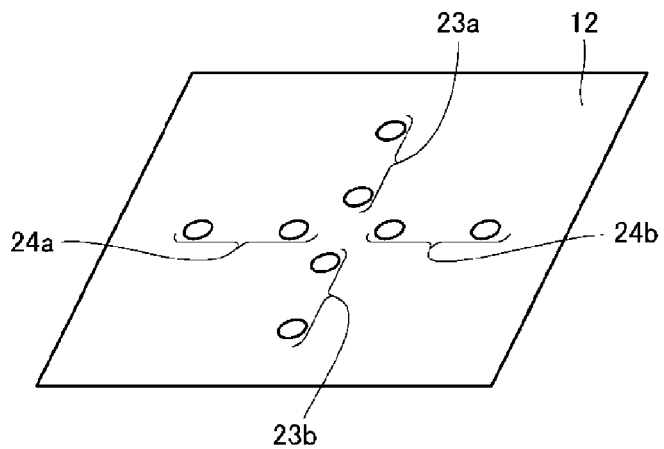
FIG. 28 is a perspective view showing a solid electrolyte layer of Embodiment 3 of the present invention.
Figure 29:
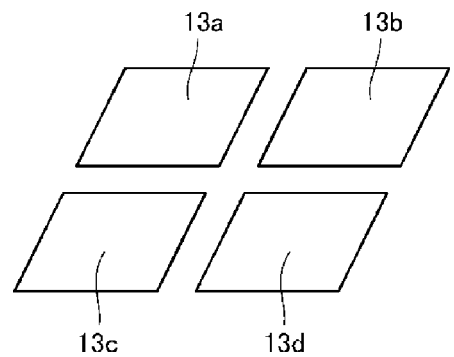
FIG. 29 is a perspective view showing an air electrode layer of Embodiment 3 of the present invention.

The portion 20a1 has a shape shown in FIG. 22, the portion 20a2 has a shape shown in FIG. 23, and the portion 20a3 has a shape shown in FIG. 24. The portion 20b has a shape shown in FIG. 25, and the air supply channels 24a and 24b are formed by fitting the air electrode layers 13a, 13b, 13c and 13d shown in FIG. 29 in the portion 20b. The portion 20c has a shape shown in FIG. 26, and the fuel gas supply channels 23a and 23b are formed by fitting the fuel electrode layers 11a, 11b, 11c and 11d shown in FIG. 27 in the portion 20c. As shown in FIG. 28, the fuel gas supply channels 23a and 23b, and the air supply channels 24a and 24b are formed in the solid electrolyte layer 12.

As shown in FIGS. 2 and 22, in the portion 20a1 of the support structure 20 which is not in contact with the fuel electrode layer 11 nor the air electrode layer 13, each of the fuel gas supply channels 23a, 23b and the air supply channels 24a, 24b is formed in the form of a plurality of openings which are arranged at intervals in one direction, that is, a plurality of circular through-holes. That is, each of the fuel gas supply channels 23a and 23b, and the air supply channels 24a and 24b has a plurality of roughly circular cross-sections arranged at intervals.

As shown in FIGS. 2 and 23, in the portion 20a2 of the support structure 20 in contact with the fuel electrode layer 11, each of the fuel gas supply channels 23a and 23b has a roughly rectangular cross-section, and each of the air supply channels 24a and 24b has a plurality of roughly circular cross-sections arranged at intervals. In addition, the fuel gas distribution channel forming layers 231a and 231b disappear after firing, and thereby, these layers become fuel gas distribution channels which lead to fuel gas supply channels 23a and 23b for supplying a fuel gas to the fuel electrode layer 11 and distribute a fuel gas to the fuel electrode layer 11. A portion between the fuel gas distribution channel forming layers 231a and 231b is a portion which forms a wall of fuel gas distribution channels, and the portion is referred to as a rib.

As shown in FIGS. 2 and 24, in the portion 20a3 of the support structure 20 in contact with the air electrode layer 13, each of the air supply channels 24a and 24b has a roughly rectangular cross-section, and each of the fuel gas supply channels 23a and 23b has a plurality of roughly circular cross-sections arranged at intervals. In addition, the air distribution channel forming layers 241a and 241b disappear after firing, and thereby, these layers become air distribution channels which lead to air supply channels 24a and 24b for supplying air to the air electrode layer 13 and distribute air to the air electrode layer 13. A portion between the air distribution channel forming layers 241a and 241b is a portion which forms a wall of air distribution channels, and the portion is referred to as a rib.

Figure 25:
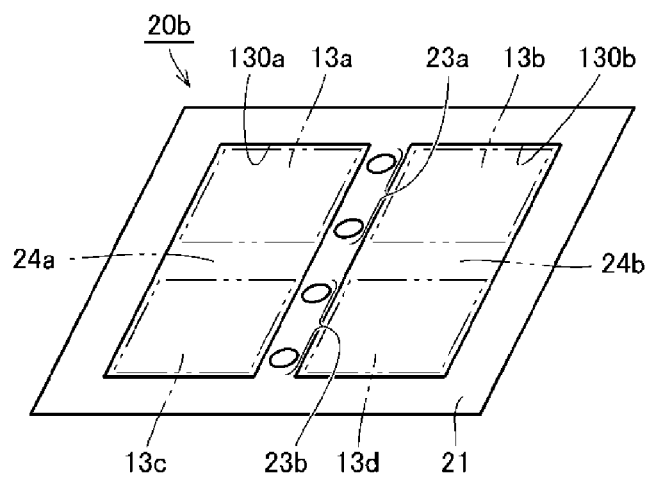
FIG. 25 is a perspective view showing a part of a support structure including an anode gas supply channel of Embodiment 3 of the present invention.

As shown in FIGS. 2 and 25, in the portion 20b of the support structure 20 in contact with the air electrode layers 13a, 13b, 13c and 13d, each of the air supply channels 24a and 24b has a roughly rectangular cross-section, and each of the fuel gas supply channels 23a and 23b has a plurality of roughly circular cross-sections arranged at intervals. In addition, in the air supply channels 24a and 24b, at least parts of the inner wall surfaces are formed of the air electrode layers 13a, 13b, 13c and 13d.

Figure 26:
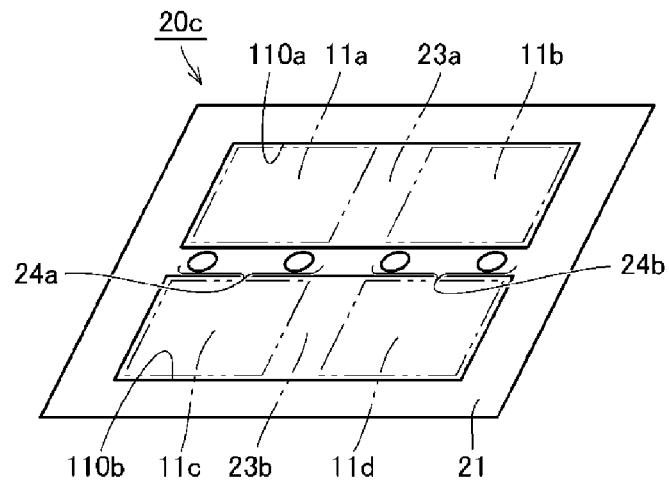
FIG. 26 is a perspective view showing a part of a support structure including a cathode gas supply channel of Embodiment 3 of the present invention.

As shown in FIGS. 2 and 26, in the portion 20c of the support structure 20 in contact with the fuel electrode layers 11a, 11b, 11c and 11d, each of the fuel gas supply channels 23a and 23b has a roughly rectangular cross-section, and each of the air supply channels 24a and 24b has a plurality of roughly circular cross-sections arranged at intervals. In addition, in the fuel gas supply channels 23a and 23b, at least parts of the inner wall surfaces are formed of the fuel electrode layers 11a, 11b, 11c and 11d.

As shown in FIG. 28, in the solid electrolyte layer 12, each of the fuel gas supply channels 23a and 23b, and the air supply channels 24a and 24b has a plurality of roughly circular cross-sections arranged at intervals.

The fuel gas supply channels 23a and 23b shown in FIG. 26 correspond to first anode gas supply channel parts, at least parts of the inner wall surfaces of which are formed of the fuel electrode layers 11a and 11b, and the air supply channels 24a and 24b shown in FIG. 25 correspond to first cathode gas supply channel parts, at least parts of the inner wall surfaces of which are formed of the air electrode layers 13a and 13b. The fuel gas supply channels 23a and 23b shown in FIGS. 22, 24, 25 and 28 correspond to at least apart of the second anode gas supply channel part other than the first anode gas supply channel part. The air supply channel 24 shown in FIGS. 22, 23, 26 and 28 corresponds to at least a part of the second cathode gas supply channel part other than the first cathode gas supply channel part.

Since the above-mentioned constitution is used, the first cross-section areas (total areas of roughly rectangular cross-sections) of the fuel gas supply channels 23a and 23b (the first anode gas supply channel part) shown in FIG. 26 are larger than the second cross-section areas (total areas of roughly circular cross-sections) of the fuel gas supply channels 23a and 23b (at least a part of the second anode gas supply channel part) shown in FIGS. 22, 24, 25 and 28. The third cross-section areas (total areas of roughly rectangular cross-sections) of the air supply channels 24a and 24b (the first cathode gas supply channel part) shown in FIG. 25 are larger than the fourth cross-section areas (total areas of roughly circular cross-sections) of the air supply channels 24a and 24b (at least a part of the second cathode gas supply channel part) shown in FIGS. 22, 23, 26 and 28.

Accordingly, the solid electrolyte fuel battery 100 of Embodiment 3 can achieve the same operation and effect as in Embodiment 1 described above.

It is preferred that at least one of a ratio of the first cross-section area of the fuel gas supply channel 23a, 23b formed in a cell to the second cross-section area of at least a part of the fuel gas supply channel 23a, 23b formed in a portion other than a cell, and a ratio of the third cross-section area of the air supply channel 24a, 24b formed in a cell to the fourth cross-section area of at least a part of the air supply channel 24a, 24b formed in a portion other than a cell, is 1.1 or more and 14 or less. It is more preferred that at least one of a ratio of the first cross-section area of the fuel gas supply channel 23a, 23b formed in a cell to the second cross-section area of at least a part of the fuel gas supply channel 23a, 23b formed in a portion other than a cell, and a ratio of the third cross-section area of the air supply channel 24a, 24b formed in a cell to the fourth cross-section area of at least a part of the air supply channel 24a, 24b formed in a portion other than a cell, is 2 or more and 10 or less. Also in this case, the same operation and effect as in Embodiment 1 described above can be achieved.

In addition, in Embodiment 3, not only the cross-section areas of the fuel gas supply channels 23a and 23b, at least parts of the inner wall surfaces of which are formed of the fuel electrode layers 11a and 11b, as shown in FIG. 26, but also the cross-section areas (total areas of roughly rectangular cross-sections) of the fuel gas supply channels 23a and 23b respectively formed in the portions 20a2 and 20c of the support structure 20 in contact with the fuel electrode layers 11a and 11b, as shown in FIGS. 23 and 26, are larger than the cross-section areas (total areas of roughly circular cross-sections) of the fuel gas supply channels 23a and 23b shown in FIGS. 22, 24, 25 and 28. Not only the cross-section areas of the air supply channels 24a and 24b, at least parts of the inner wall surfaces of which are formed of the air electrode layers 13a and 13b, as shown in FIG. 25, but also the cross-section areas (total areas of roughly rectangular cross-sections) of the air supply channels 24a and 24b formed in the portions 20a3 and 20b of the support structure 20 in contact with the air electrode layers 13a and 13b, as shown in FIGS. 24 and 25, are larger than the cross-section areas (total areas of roughly circular cross-sections) of the air supply channels 24a and 24b (at least a part of the second cathode gas supply channel part) shown in FIGS. 22, 23, 26 and 28.

In the solid electrolyte fuel batteries 100 of Embodiment 2 and Embodiment 3, since at least one of the fuel gas supply channels 23a, 23b and the air supply channels 24a, 24b are arranged within the battery structure part, at least one of the fuel gas and the air flows from the inside of the battery structure part to the outside. Therefore, it is possible to prevent the temperatures of the intercellular separation part 21a serving the function of a separator and the cell from locally increasing resulting from the heat generated by power generation. Thereby, thermal stress produced in the intercellular separation part 21a can be reduced, and therefore fractures of the intercellular separation part 21a and the cell can be prevented.

Further, since at least one of the fuel gas and the air flows from the inside of the battery structure part to the outside, these gases act as a gas for cooling the heat generated by power generation. Therefore, a temperature rise within the battery structure part can be suppressed.

Moreover, since at least one of the fuel electrode layers 11a to 11d and the air electrode layers 13a to 13d are split by at least one of the fuel gas supply channels 23a, 23b and the air supply channels 24, 24a, 24b arranged within the battery structure part, a location where heat is generated by power generation can be distributed. Thereby, a temperature rise within the battery structure part can be suppressed.

In the solid electrolyte fuel batteries 100 of Embodiments 1 to 3, the gas supply channel structure part 21b and the intercellular separation part 21a are integrally formed. By employing such a constitution, since the gas supply channel structure part 21b serving the function of a manifold and the intercellular separation part 21a serving the function of a separator are integrally formed, a portion serving the dual function of a separator and a manifold is continuously formed. Therefore, sealing members between separators and between the cells and the manifold, which are required in conventional solid electrolyte fuel batteries, become unnecessary. Thereby, a sealing property to a gas as a whole battery can be enhanced and the number of parts can be reduced, and consequently the number of process steps can be reduced.

Further, in the solid electrolyte fuel battery 100 of the present invention, the gas supply channel structure part 21b and the solid electrolyte layer 12 are integrally formed. By employing such a constitution, it becomes unnecessary to seal, by using glass or the like, a portion where the gas supply channel structure part 21b is in contact with the solid electrolyte layer 12.

In addition, in the solid electrolyte fuel batteries 100 of Embodiments 1 to 3, although fuel gas supply channels 23, 23a, 23b and air supply channels 24, 24a, 24b are formed so as to have roughly rectangular or roughly circular cross-sections, a cross-section shape of the channel is not limited, and various geometrical planar shape may be employed.

EXAMPLES

Hereinafter, Example 1 in which a solid electrolyte fuel battery of the present invention was prepared based on Embodiment 1 described above, and Comparative Examples 1 and 2 in which solid electrolyte fuel batteries were prepared in order to compare with a structure of the present invention will be described.

Example 1

First, material powders of members constituting the unit module of a solid electrolyte fuel battery of Embodiment 1 shown in FIGS. 1 to 3 were prepared as follows.

Fuel electrode layer 11: A mixture of 60% by weight of nickel oxide (NiO) and 40% by weight of zirconia ($ZrO_2$) stabilized with scandia ($Sc_2O_3$) added in an amount 10 mole % and ceria ($CeO_2$) added in an amount 1 mole % (scandia ceria stabilized zirconia: ScCeSZ)

Solid electrolyte layer 12: Zirconia ($ZrO_2$) stabilized with scandia ($Sc_2O_3$) added in an amount 10 mole % and ceria ($CeO_2$) added in an amount 1 mole % (scandia ceria stabilized zirconia: ScCeSZ)

Air electrode layer 13: A mixture of 60% by weight of $La_{0.8}Sr_{0.2}MnO_3$ and 40% by weight of zirconia ($ZrO_2$) stabilized with scandia ($Sc_2O_3$) added in an amount 10 mole % and ceria ($CeO_2$) added in an amount 1 mole % (scandia ceria stabilized zirconia: ScCeSZ)

In order to prepare electrically insulating materials for the portion 20a, the portion 20b and the portion 20c (FIG. 2) in the solid electrolyte fuel battery support structure 20 shown FIG. 1, the following material powder was prepared.

Zirconia ($ZrO_2$) stabilized with yttria ($Y_2O_3$) added in an amount 3 mole % (yttria stabilized zirconia: 3YSZ)

Using the materials thus prepared, first, green sheets having shapes of three types were prepared as follows for the portions 20a, 20b and 20c constituting a solid electrolyte fuel battery support structure 20, as shown in FIG. 2. The portion 20a is configured by laminating a portion 20a2 (refer to FIG. 5), a portion 20a1 (refer to FIG. 4) and a portion 20a3 (refer to FIG. 6) in this order from the bottom. The portion 20b is shown in FIG. 7. The portion 20c is shown in FIG. 8.

With respect to the portions 20a1, 20a2 and 20a3, an electrically insulating material powder, a polyvinyl butyral-based binder and a mixture of ethanol and toluene (mixing ratio is 1:4 by weight) as an organic solvent were mixed, and the resulting mixture was applied by a doctor blade method to prepare green sheets for the portions 20a1, 20a2 and 20a3 of the solid electrolyte fuel battery support structure 20.

In the green sheets for the portions 20a1, 20a2 and 20a3, as shown in FIGS. 4, 5 and 6, a plurality of through-holes for forming electrical conductors 22 in an electrically insulating body 21 was prepared. A conductive paste-filled layer for forming the electrical conductors 22 was prepared by filling these through-holes with a paste composed of 70% by weight of silver and 30% by weight of palladium.

Further, as shown in FIGS. 4, 5 and 6, circular through-holes, and long and thin rectangular through-holes were formed in the portions 20a1, 20a2 and 20a3 in order to form the fuel gas supply channel 23 and the air supply channel 24. The circular through-hole had a diameter of 4.5 mm, and five through-holes were evenly arranged at intervals of 12 mm. Accordingly, the total area of the circular through-holes was about 80 $mm^2$. The rectangular through-hole was 4.5 mm wide and 61.5 mm long. Accordingly, the area of the rectangular through-hole was about 277 $mm^2$.

In the green sheet for the portion 20a2, as shown in FIG. 5, fuel gas distribution channel forming layers 231a and 231b made of polyethylene terephthalate (PET) were formed so as to connect to the through-hole for forming the fuel gas supply channel 23. The fuel gas distribution channel forming layers 231a and 231b disappear after firing, and thereby, these layers become fuel gas distribution channels which lead to a fuel gas supply channel 23 for supplying a fuel gas and distribute a fuel gas to the fuel electrode layer 11. In addition, FIG. 5 illustrates as if three fuel gas distribution channels are formed, but in fact, many fuel gas distribution channels of 0.8 mm wide and 61.5 mm long were arranged at 0.8 mm intervals (ribs).

In the green sheet for the portion 20a3, as shown in FIG. 6, air distribution channel forming layers 241a, 241b and 241c made of polyethylene terephthalate (PET) were formed so as to connect to the through-hole for forming the air supply channel 24. The air distribution channel forming layers 241a, 241b and 241c disappear after firing, and thereby, these layers become air distribution channels which lead to an air supply channel 24 for supplying air and distribute air to the air electrode layer 13. In addition, FIG. 6 illustrates as if three air distribution channels are formed, but in fact, many fuel gas distribution channels of 0.8 mm wide and 61.5 mm long were arranged at 0.8 mm intervals (ribs).

Next, with respect to the portion 20b, an electrically insulating material powder, a polyvinyl butyral-based binder and a mixture of ethanol and toluene (mixing ratio is 1:4 by weight) as an organic solvent were mixed, and the resulting mixture was applied by a doctor blade method to prepare a green sheet for the portion 20b of the solid electrolyte fuel battery support structure 20.

In the green sheet for the portion 20b, as shown in FIG. 7, a sheet made of a nearly U-shaped electrically insulating body 21 was prepared so that a green sheet for the air electrode layer 13 can be fit in a clearance by making the clearance for forming the air supply channel 24 shown in FIG. 3. Further, in order to form the fuel gas supply channel 23 in the electrically insulating body 21, as shown in FIG. 7, a circular through-hole having a size similar to the above was prepared in the green sheet for the portion 20b.

Then, with respect to the portion 20c, an electrically insulating material powder, a polyvinyl butyral-based binder and a mixture of ethanol and toluene (mixing ratio is 1:4 by weight) as an organic solvent were mixed, and the resulting mixture was applied by a doctor blade method to prepare a green sheet for the portion 20c of the solid electrolyte fuel battery support structure 20.

In the green sheet for the portion 20c, as shown in FIG. 8, a sheet made of a nearly U-shaped electrically insulating body 21 was prepared so that a green sheet for the fuel electrode layer 11 can be fit in a clearance by making the clearance for forming the fuel gas supply channel 23 shown in FIG. 3. Further, in order to form the air supply channel 24 in the electrically insulating body 21, as shown in FIG. 8, a circular through-hole having a size similar to the above was prepared in the green sheet for the portion 20c.

Next, green sheets for an air electrode layer 13 and a fuel electrode layer 11 respectively shown in FIG. 3, and a green sheet for a solid electrolyte layer 12 shown in FIGS. 1 and 2 were prepared in the following manner.

Powders of materials of a fuel electrode layer 11 and an air electrode layer 13, a polyvinyl butyral-based binder and a mixture of ethanol and toluene (mixing ratio is 1:4 by weight) as an organic solvent were mixed, and the resulting mixtures were respectively applied by a doctor blade method to prepare green sheets for the fuel electrode layer 11 and the air electrode layer 13, respectively.

A powder of a material of a solid electrolyte layer 12, a polyvinyl butyral-based binder and a mixture of ethanol and toluene (mixing ratio is 1:4 by weight) as an organic solvent were mixed, and the resulting mixture was applied by a doctor blade method to prepare a green sheet for the solid electrolyte layer 12.

Figure 9:
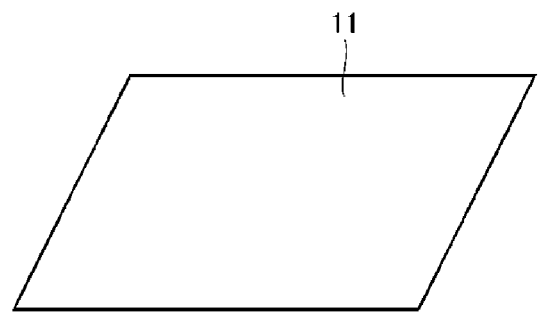
FIG. 9 is a perspective view showing a fuel electrode layer of Embodiment 1 of the present invention.
Figure 10:
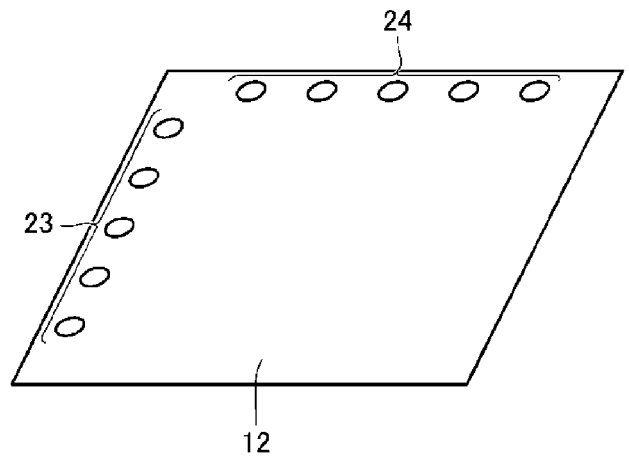
FIG. 10 is a perspective view showing a solid electrolyte layer of Embodiment 1 of the present invention.
Figure 11:
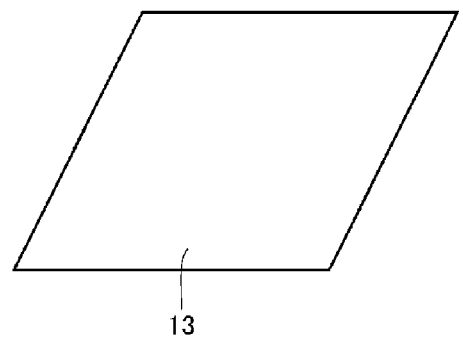
FIG. 11 is a perspective view showing an air electrode layer of Embodiment 1 of the present invention.

Specifically, a green sheet for the fuel electrode layer 11 was prepared in a shape shown in FIG. 9, a green sheet for the solid electrolyte layer 12 was prepared in a shape shown in FIG. 10, and a green sheet for the air electrode layer 13 was prepared in a shape shown in FIG. 11. As shown in FIG. 10, long and thin rectangular through-holes having a size similar to the above for forming the fuel gas supply channel 23 and the air supply channel 24 were formed in the green sheet for the solid electrolyte layer 12.

Green sheets for the portions 20c, 20a and 20b of a solid electrolyte fuel battery support structure 20, which were thus prepared, were laminated in turn, and in these green sheets, green sheets for the air electrode layer 13, the solid electrolyte layer 12 and the fuel electrode layer 11 were fit in turn to be laminated, and thereby, four sets of solid electrolyte fuel battery unit modules were laminated, the unit module consisting of the solid electrolyte fuel battery support structure 20 (thickness of the fired intercellular separation part 21a: 100 µm)/air electrode layer 13 (thickness of the fired layer: 200 µm)/solid electrolyte layer 12 (thickness of the fired layer: 20 µm)/fuel electrode layer 11 (thickness of the fired layer: 200 µm), as shown in FIG. 2, and the portion 20a of a solid electrolyte fuel battery support structure 20 not having a gas supply channel formed was laminated on the uppermost section. The resulting laminate was subjected to cold isostatic pressing at a temperature of 80° C. and at a pressure of 1000 kgf/cm² for 2 minutes to be press-bonded. The press-bonded body was subjected to a degreasing treatment in a range of 400° C. to 500° C. and then retained at temperatures of from 1000° C. to 1300° C. for 2 hours to be fired. A sample (plane area: 85 mm×85 mm) of a solid electrolyte fuel battery of Example 1 was prepared in this way.

To a top surface and a bottom surface, respectively, of the sample of the solid electrolyte fuel battery of Example 1 thus prepared, current collecting plates 30 and 40 made of silver and having a thickness of 20 µm were fixed, as shown in FIG. 2.

In the obtained solid electrolyte fuel battery 100 of Example 1 (corresponding to Embodiment 1), the first cross-section area (an area of one rectangular cross-section: about 277 mm²) of the fuel gas supply channel 23 formed in the fuel electrode layer 11 to which the fuel gas is supplied, is larger than the second cross-section area (a total area of five circular cross-sections: about 80 mm²) of at least a part of the fuel gas supply channel 23 other than the above-mentioned fuel gas supply channel 23, and the third cross-section area (an area of one rectangular cross-section: about 277 mm²) of the air supply channel 24 formed in the air electrode layer 13 to which the air is supplied, is larger than the fourth cross-section area (a total area of five circular cross-sections: about 80 mm²) of at least a part of the air supply channel 24 other than the above-mentioned air supply channel 24.

Comparative Example 1

First, the material powders of the fuel electrode layer 11, the solid electrolyte layer 12, the air electrode layer 13 and portions 20a to 20c, which were respectively members constituting the unit module of a solid electrolyte fuel battery shown in FIGS. 1, 2 and 3, were prepared in the same manner as in Example 1.

Figure 33:
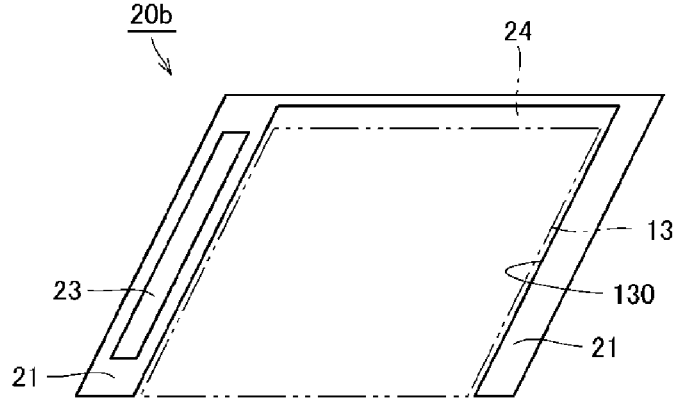
FIG. 33 is a perspective view showing a part of a support structure including an anode gas supply channel of a comparative embodiment 1 of the present invention.
Figure 34:
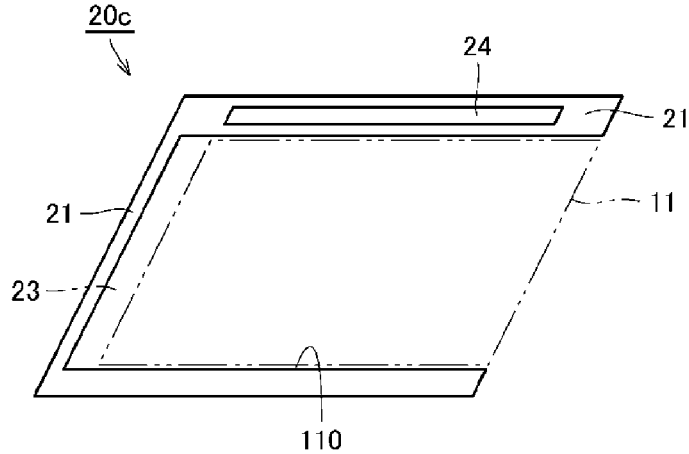
FIG. 34 is a perspective view showing a part of a support structure including a cathode gas supply channel of a comparative embodiment 1 of the present invention.

Using the materials thus prepared, first, green sheets having shapes of three types were prepared as follows for the portions 20a, 20b and 20c constituting a solid electrolyte fuel battery support structure 20, as shown in FIG. 2. The portion 20a is configured by laminating a portion 20a2 (refer to FIG. 31), a portion 20a1 (refer to FIG. 30) and a portion 20a3 (refer to FIG. 32) in this order from the bottom. A portion 20b is shown in FIG. 33. A portion 20c is shown in FIG. 34.

Green sheets for the portions 20a1, 20a2, and 20a3 were prepared in the same manner as in Example 1.

Figure 30:
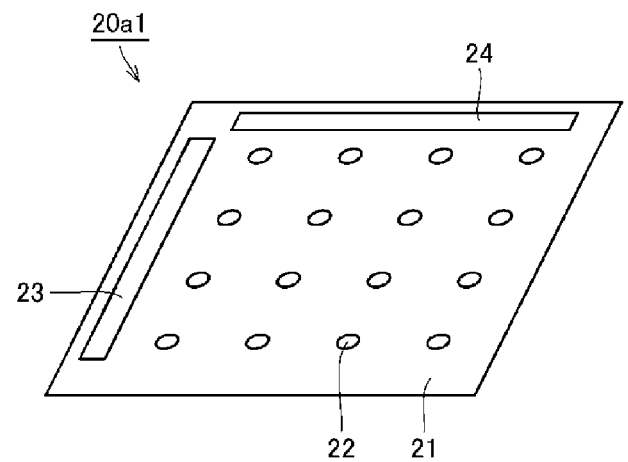
FIG. 30 is a perspective view showing a part of a support structure including an intercellular separation part, an anode gas supply channel, and a cathode gas supply channel of a comparative embodiment 1 as one comparison of Embodiment 1 of the present invention.
Figure 31:
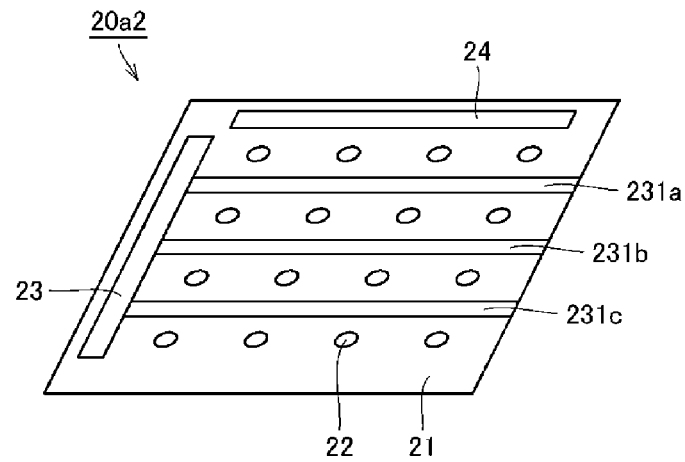
FIG. 31 is a perspective view showing a part of a support structure including an intercellular separation part, an anode gas supply channel and an anode gas distribution channel, and a cathode gas supply channel of a comparative embodiment 1 of the present invention.
Figure 32:
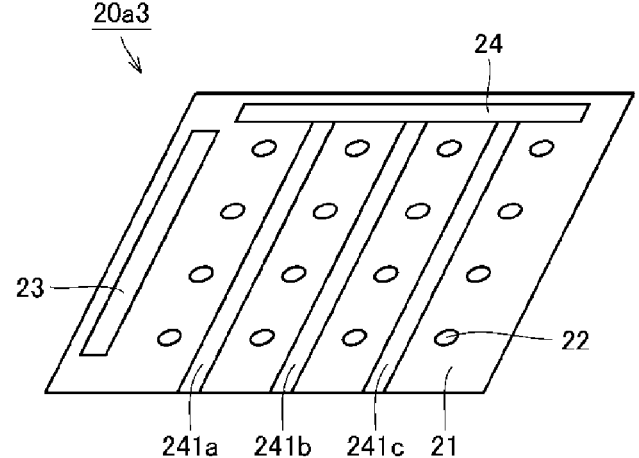
FIG. 32 is a perspective view showing a part of a support structure including an intercellular separation part, an anode gas supply channel, and a cathode gas supply channel and a cathode gas distribution channel of a comparative embodiment 1 of the present invention.

In the green sheets for the portions 20a1, 20a2 and 20a3, as shown in FIGS. 30, 31 and 32, a conductive paste-filled layer for forming a plurality of electrical conductors 22 in an electrically insulating body 21 was prepared in the same manner as in Example 1.

Further, as shown in FIGS. 30, 31 and 32, long and thin rectangular through-holes were formed in the portions 20a1, 20a2 and 20a3 in order to form the fuel gas supply channel 23 and the air supply channel 24. A size of the rectangular through-hole is the same as in Example 1.

In the green sheet for the portion 20a2, as shown in FIG. 31, fuel gas distribution channel forming layers 231a, 231b and 231c made of polyethylene terephthalate (PET) were formed so as to connect to the through-hole for forming the fuel gas supply channel 23. The fuel gas distribution channel forming layers 231a, 231b and 231c disappear after firing, and thereby, these layers become fuel gas distribution channels which lead to a fuel gas supply channel 23 for supplying a fuel gas and distribute a fuel gas to the fuel electrode layer 11. A size and arrangement of the fuel gas distribution channel, and the number of the fuel gas distribution channels are the same as those of Example 1.

In the green sheet for the portion 20a3, as shown in FIG. 32, air distribution channel forming layers 241a, 241b and 241c made of polyethylene terephthalate (PET) were formed so as to connect to the through-hole for forming the air supply channel 24. The air distribution channel forming layers 241a, 241b and 241c disappear after firing, and thereby, these layers become air distribution channels which lead to an air supply channel 24 for supplying air and distribute air to the air electrode layer 13. A size and arrangement of the air distribution channel, and the number of the air distribution channels are the same as those of Example 1.

Next, a green sheet for the portion 20b was prepared in the same manner as in Example 1.

In the green sheet for the portion 20b, a sheet made of an electrically insulating body 21 having such a shape as shown in FIG. 33 was prepared so that a green sheet for the air electrode layer 13 can be fit in a clearance by making the clearance for forming the air supply channel 24 shown in FIG. 3. Further, as shown in FIGS. 2 and 3, a long and thin rectangular through-hole for forming the fuel gas supply channel 23 in the electrically insulating body 21 was formed in the green sheet for the portion 20b. A size of the rectangular through-hole is the same as in Example 1.

Then, a green sheet for the portion 20c was prepared in the same manner as in Example 1.

In the green sheet for the portion 20c, a sheet made of an electrically insulating body 21 having such a shape as shown in FIG. 34 was prepared so that a green sheet for the fuel electrode layer 11 can be fit in a clearance by making the clearance for forming the fuel gas supply channel 23 shown in FIG. 3. Further, as shown in FIG. 3, a long and thin rectangular through-hole for forming the air supply channel 24 in the electrically insulating body 21 was prepared in the green sheet for the portion 20c. A size of the rectangular through-hole is the same as in Example 1.

Next, green sheets for an air electrode layer 13 and a fuel electrode layer 11 respectively shown in FIG. 3, and a green sheet for a solid electrolyte layer 12 shown in FIGS. 1 and 2 were prepared in the same manner as in Example 1.

Figure 35:
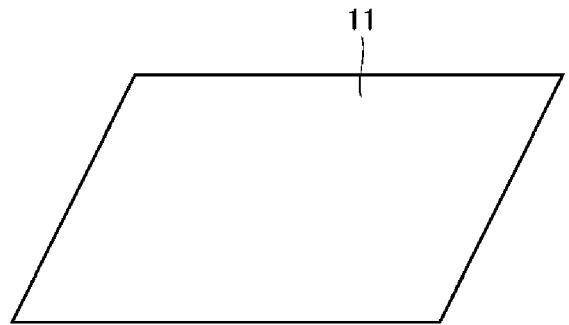
FIG. 35 is a perspective view showing a fuel electrode layer of a comparative embodiment 1 of the present invention.
Figure 36:
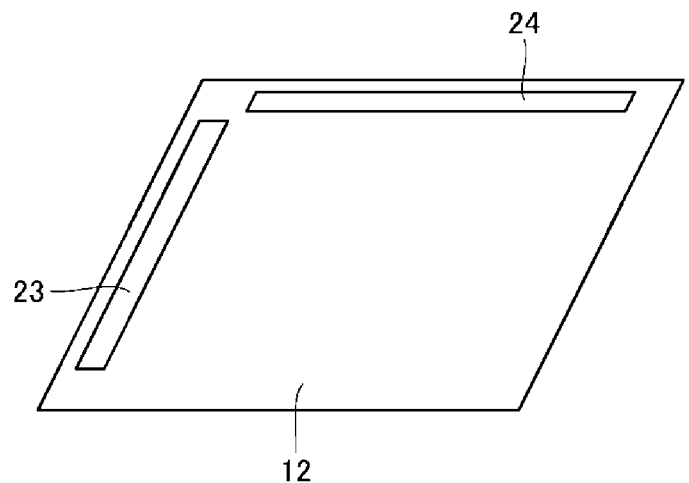
FIG. 36 is a perspective view showing a solid electrolyte layer of a comparative embodiment 1 of the present invention.
Figure 37:
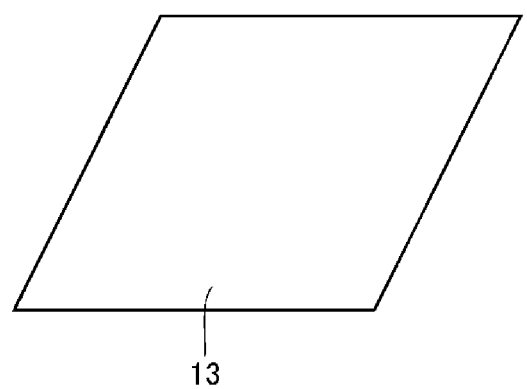
FIG. 37 is a perspective view showing an air electrode layer of a comparative embodiment 1 of the present invention.

Specifically, a green sheet for the fuel electrode layer 11 was prepared in a shape shown in FIG. 35, a green sheet for the solid electrolyte layer 12 was prepared in a shape shown in FIG. 36, and a green sheet for the air electrode layer 13 was prepared in a shape shown in FIG. 37. As shown in FIG. 36, long and thin rectangular through-holes for forming the fuel gas supply channel 23 and the air supply channel 24 were formed in the green sheet for the solid electrolyte layer 12. A size of the rectangular through-hole is the same as in Example 1.

Green sheets for the portions 20c, 20a and 20b of a solid electrolyte fuel battery support structure 20, which were thus prepared, were laminated in turn, and in these green sheets, green sheets for the air electrode layer 13, the solid electrolyte layer 12 and the fuel electrode layer 11 were fit in turn to be laminated, and thereby, four sets of solid electrolyte fuel battery unit modules were laminated, the unit module consisting of the solid electrolyte fuel battery support structure 20 (thickness of the fired intercellular separation part 21a: 100 µm)/air electrode layer 13 (thickness of the fired layer: 200 µm)/solid electrolyte layer 12 (thickness of the fired layer: 20 µm)/fuel electrode layer 11 (thickness of the fired layer: 200 µm), as shown in FIG. 2, and the portion 20a of a solid electrolyte fuel battery support structure 20 not having a gas supply channel formed was laminated on the uppermost section. The resulting laminate was subjected to cold isostatic pressing to be press-bonded in the same manner as in Example 1. The press-bonded body was subjected to a degreasing treatment and then fired in the same manner as in Example 1. A sample (plane area: 85 mm×85 mm) of a solid electrolyte fuel battery of Comparative Example 1 was prepared in this way.

To a top surface and a bottom surface, respectively, of the sample of the solid electrolyte fuel battery of Comparative Example 1 thus prepared, current collecting plates 30 and 40 made of silver and having a thickness of 20 µm were fixed, as shown in FIG. 2.

In the obtained sample of the solid electrolyte fuel battery 100 of Comparative Example 1, each of cross-sections of all fuel gas supply channels 23 and air supply channels 24 is one rectangular cross-section. Accordingly, the cross-section area (an area of one rectangular cross-section: about 277 mm$^2$) of the fuel gas supply channel 23 formed in the fuel electrode layer 11 to which the fuel gas is supplied, is equal to the cross-section area (an area of one rectangular cross-section: about 277 mm$^2$) of at least a part of the fuel gas supply channel 23 other than the above-mentioned fuel gas supply channel 23, and the cross-section area (an area of one rectangular cross-section: about 277 mm$^2$) of the air supply channel 24 formed in the air electrode layer 13 to which the air is supplied, is equal to the cross-section area (an area of one rectangular cross-section: about 277 mm$^2$) of at least a part of the air supply channel 24 other than the above-mentioned air supply channel 24.

Comparative Example 2

First, the material powders of the fuel electrode layer 11, the solid electrolyte layer 12, the air electrode layer 13 and portions 20a to 20c, which were respectively members constituting the unit module of a solid electrolyte fuel battery shown in FIGS. 1 and 2, were prepared in the same manner as in Example 1.

Figure 41:
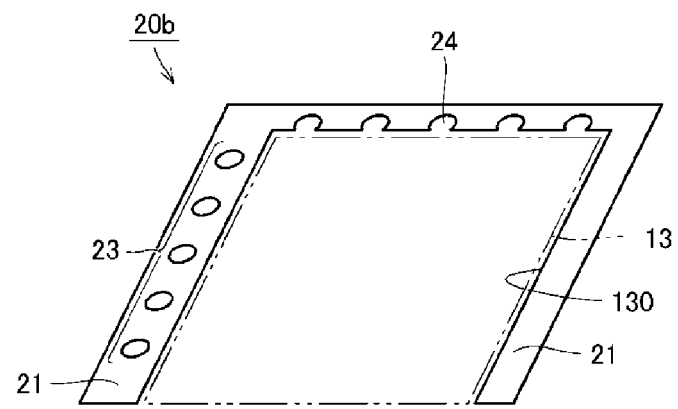
FIG. 41 is a perspective view showing a part of a support structure including an anode gas supply channel of a comparative embodiment 2 of the present invention.
Figure 42:
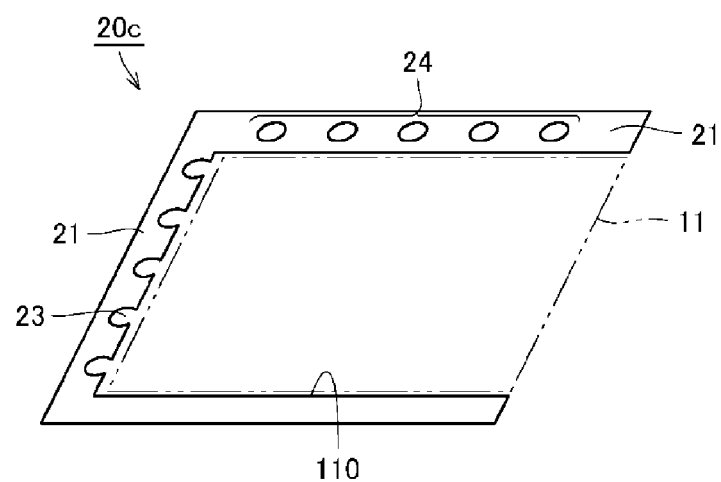
FIG. 42 is a perspective view showing a part of a support structure including a cathode gas supply channel of a comparative embodiment 2 of the present invention.

Using the materials thus prepared, first, green sheets having shapes of three types were prepared as follows for the portions 20a, 20b and 20c constituting a solid electrolyte fuel battery support structure 20, as shown in FIG. 2. The portion 20a is configured by laminating a portion 20a2 (refer to FIG. 39), a portion 20a1 (refer to FIG. 38) and a portion 20a3 (refer to FIG. 40) in this order from the bottom. A portion 20b is shown in FIG. 41. A portion 20c is shown in FIG. 42.

Green sheets for the portions 20a1, 20a2 and 20a3 were prepared in the same manner as in Example 1.

Figure 38:
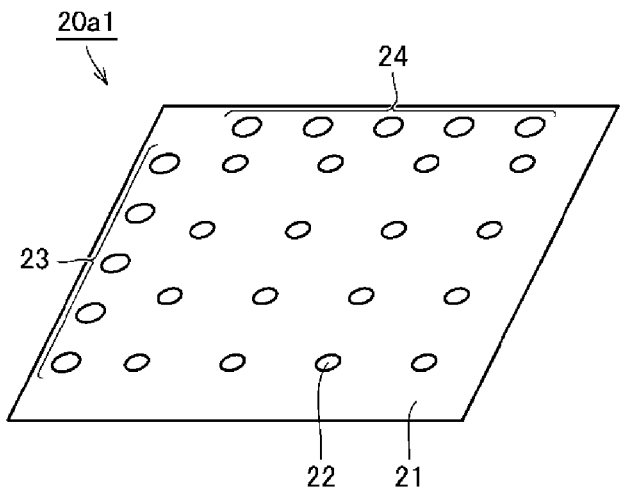
FIG. 38 is a perspective view showing a part of a support structure including an intercellular separation part, an anode gas supply channel, and a cathode gas supply channel of a comparative embodiment 2 as another comparison of Embodiment 1 of the present invention.
Figure 39:
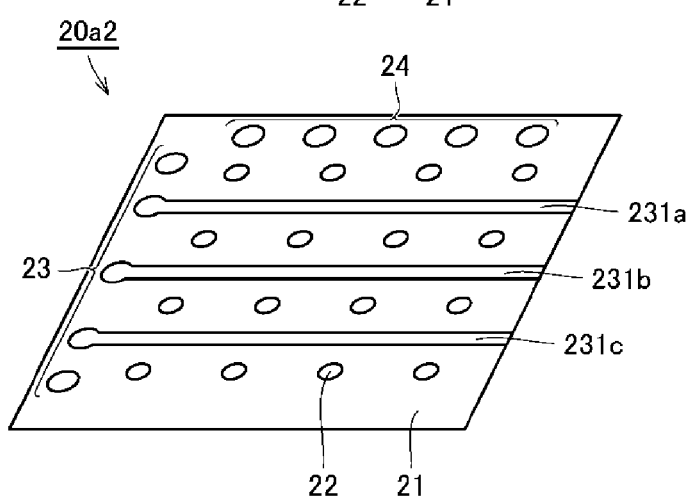
FIG. 39 is a perspective view showing a part of a support structure including an intercellular separation part, an anode gas supply channel and an anode gas distribution channel, and a cathode gas supply channel of a comparative embodiment 2 of the present invention.
Figure 40:
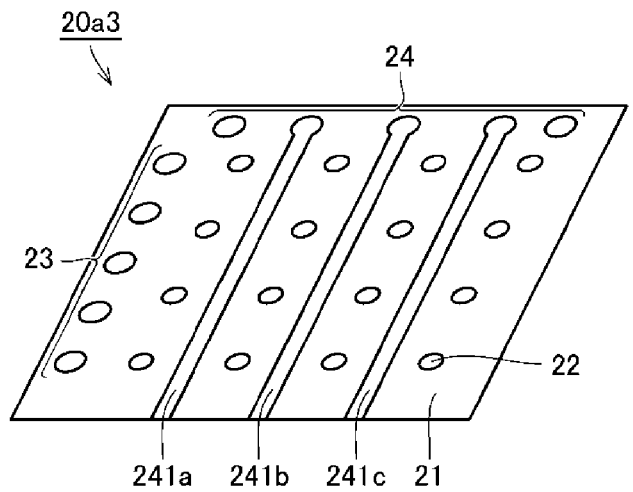
FIG. 40 is a perspective view showing a part of a support structure including an intercellular separation part, an anode gas supply channel, and a cathode gas supply channel and a cathode gas distribution channel of a comparative embodiment 2 of the present invention.

In the green sheets for the portions 20a1, 20a2 and 20a3, as shown in FIGS. 38, 39 and 40, a conductive paste-filled layer for forming a plurality of electrical conductors 22 in an electrically insulating body 21 was prepared in the same manner as in Example 1.

Further, as shown in FIGS. 38, 39 and 40, circular through-holes were formed in the portions 20a1, 20a2 and 20a3 in order to form the fuel gas supply channel 23 and the air supply channel 24. A size and arrangement of the circular through-hole, and the number of the circular through-holes are the same as those of Example 1.

In the green sheet for the portion 20a2, as shown in FIG. 39, fuel gas distribution channel forming layers 231a, 231b and 231c made of polyethylene terephthalate (PET) were formed so as to connect to through-holes for forming the fuel gas supply channel 23. The fuel gas distribution channel forming layers 231a, 231b and 231c disappear after firing, and thereby, these layers become fuel gas distribution channels which lead to a fuel gas supply channel 23 for supplying a fuel gas and distribute a fuel gas to the fuel electrode layer 11. A size and arrangement of the fuel gas distribution channel, and the number of the fuel gas distribution channels are the same as those of Example 1.

In the green sheet for the portion 20a3, as shown in FIG. 40, air distribution channel forming layers 241a, 241b and 241c made of polyethylene terephthalate (PET) were formed so as to connect to through-holes for forming the air supply channel 24. The air distribution channel forming layers 241a, 241b and 241c disappear after firing, and thereby, these layers become air distribution channels which lead to an air supply channel 24 for supplying air and distribute air to the air electrode layer 13. A size and arrangement of the air distribution channel, and the number of the air distribution channels are the same as those of Example 1.

Next, a green sheet for the portion 20b was prepared in the same manner as in Example 1.

In the green sheet for the portion 20b, as shown in FIG. 41, a sheet made of a nearly U-shaped electrically insulating body 21 was prepared so that a green sheet for the air electrode layer 13 can be fit in a clearance by making the clearance for forming the air supply channel 24 having a circular cross-section. Further, circular through-holes for forming the fuel gas supply channel 23 in the electrically insulating body 21 were formed in the green sheet for the portion 20b. A size and arrangement of the circular through-hole, and the number of the circular through-holes are the same as those of Example 1.

Then, a green sheet for the portion 20c was prepared in the same manner as in Example 1.

In the green sheet for the portion 20c, as shown in FIG. 42, a sheet made of a nearly U-shaped electrically insulating body 21 was prepared so that a green sheet for the fuel electrode layer 11 can be fit in a clearance by making the clearance for forming the fuel gas supply channel 23 having a circular cross-section. Further, circular through-holes for forming the air supply channel 24 in the electrically insulating body 21 were formed in the green sheet for the portion 20c. A size and arrangement of the circular through-hole, and the number of the circular through-holes are the same as those of Example 1.

Next, green sheets for an air electrode layer 13, a fuel electrode layer 11 and a solid electrolyte layer 12 were prepared in the same manner as in Example 1.

Figure 43:
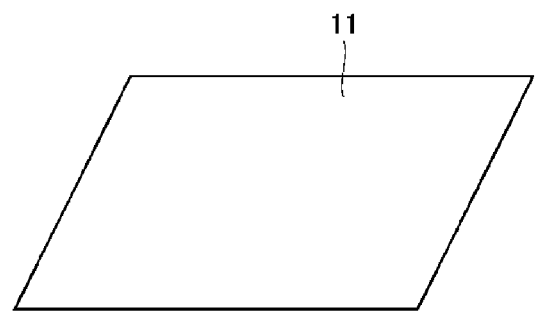
FIG. 43 is a perspective view showing a fuel electrode layer of a comparative embodiment 2 of the present invention.
Figure 44:
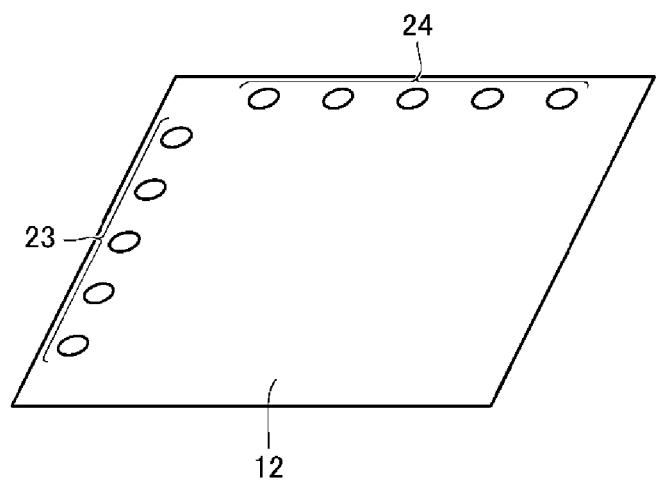
FIG. 44 is a perspective view showing a solid electrolyte layer of a comparative embodiment 2 of the present invention.
Figure 45:
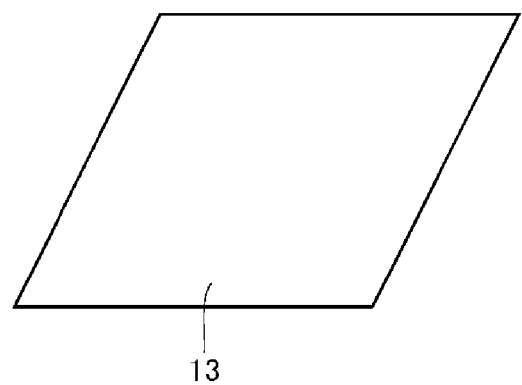
FIG. 45 is a perspective view showing an air electrode layer of a comparative embodiment 2 of the present invention.

Specifically, a green sheet for the fuel electrode layer 11 was prepared in a shape shown in FIG. 43, a green sheet for the solid electrolyte layer 12 was prepared in a shape shown in FIG. 44, and a green sheet for the air electrode layer 13 was prepared in a shape shown in FIG. 45. Further, as shown in FIG. 44, circular through-holes for forming the fuel gas supply channel 23 and the air supply channel 24 were formed in the green sheet for the solid electrolyte layer 12. A size and arrangement of the circular through-hole, and the number of the circular through-holes are the same as those of Example 1.

Green sheets for the portions 20c, 20a and 20b of a solid electrolyte fuel battery support structure 20, which were thus prepared, were laminated in turn, and in these green sheets, green sheets for the air electrode layer 13, the solid electrolyte layer 12 and the fuel electrode layer 11 were fit in turn to be laminated, and thereby, four sets of solid electrolyte fuel battery unit modules were laminated, the unit module consisting of the solid electrolyte fuel battery support structure 20 (thickness of the fired intercellular separation part 21a: 100 μm)/air electrode layer 13 (thickness of the fired layer: 200 μm)/solid electrolyte layer 12/fuel electrode layer 11 (thickness of the fired layer: 200 μm), as shown in FIG. 2, and the portion 20a of a solid electrolyte fuel battery support structure 20 not having a gas supply channel formed was laminated on the uppermost section. The resulting laminate was subjected to cold isostatic pressing to be press-bonded in the same manner as in Example 1. The press-bonded body was subjected to a degreasing treatment and then fired in the same manner as in Example 1. A sample (plane area: 85 mm×85 mm) of a solid electrolyte fuel battery of Comparative Example 2 was prepared in this way.

To a top surface and a bottom surface, respectively, of the sample of the solid electrolyte fuel battery of Comparative Example 2 thus prepared, current collecting plates 30 and 40 made of silver and having a thickness of 20 μm were fixed, as shown in FIG. 2.

In the obtained sample of the solid electrolyte fuel battery 100 of Comparative Example 2, cross-sections of all fuel gas supply channels 23 and air supply channels 24 are respectively five circular cross-sections. Accordingly, the cross-section area (a total area of five circular cross-sections: about 80 mm$^2$) of the fuel gas supply channel 23 formed in the fuel electrode layer 11 to which the fuel gas is supplied, is equal to the cross-section area (a total area of five circular cross-sections: about 80 mm$^2$) of at least a part of the fuel gas supply channel 23 other than the above-mentioned fuel gas supply channel 23, and the cross-section area (a total area of five circular cross-sections: about 80 mm$^2$) of the air supply channel 24 formed in the air electrode layer 13 to which the air is supplied, is equal to the cross-section area (a total area of five circular cross-sections: about 80 mm$^2$) of at least a part of the air supply channel 24 other than the above-mentioned air supply channel 24.

(Evaluation)

Figure 46:
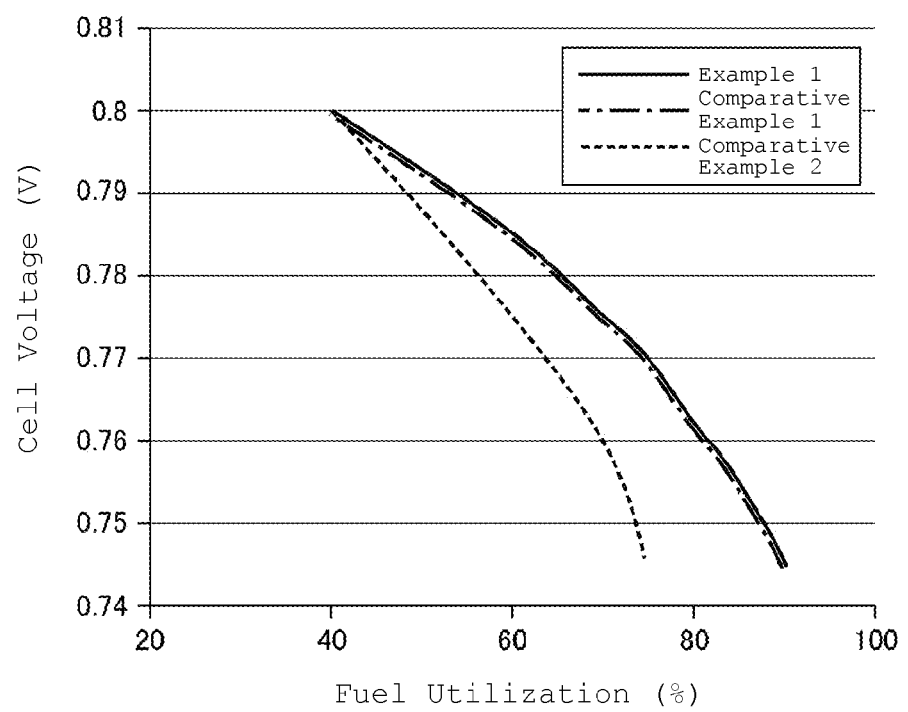
FIG. 46 is a view showing a relationship between a cell voltage generated by power generation and fuel utilization in the solid electrolyte fuel batteries of Example 1, Comparative Example 1 and Comparative Example 2 of the present invention.

Temperatures of the obtained fuel batteries of samples of Example 1 and Comparative Examples 1 and 2 were raised to 750° C., and hydrogen gas (temperature 60° C.) containing 5% of water vapor, and air were supplied through the fuel gas supply channel 23 and the air supply channel 24 to carry out power generation. Further, a current density obtained by power generation was increased to 0.5 A/cm$^2$ by increasing the amounts of hydrogen gas and air to be respectively supplied. A relationship between the resulting cell voltage (V) and fuel utilization (%) was evaluated. The evaluation results are shown in FIG. 46.

It is found from these results that in Example 1, the relationship between the resulting cell voltage (V) and fuel utilization (%) is substantially similar to that in Comparative Example 1. In other words, it is found that even though the fuel battery of Example 1 had the total of the cross-section areas (combination of five circular cross-sections and one rectangular cross-section) of the fuel gas supply channel 23 and the air supply channel 24 smaller than those of the fuel battery of Comparative Example 1, the fuel battery of Example 1 can attain the same high cell voltage as that of the fuel battery of Comparative Example 1 having a larger cross-section area (one rectangular cross-section) of all fuel gas supply channels 23 and air supply channels 24. The reason for this is likely that in Example 1 and Comparative Example 1, the gas can be equally-distributed and supplied to the fuel electrode layer 11 and the air electrode layer 13 through the fuel gas supply channel 23 and the air supply channel 24, which are formed so as to be in contact with the fuel electrode layer 11 or the air electrode layer 13 at least in a cell and have a large cross-section area.

Further, in Example 1, since at least parts of the fuel gas supply channel 23 and the air supply channel 24, which are respectively formed in a portion other than a cell, have a small cross-section area, it is possible to prevent the strength from being reduced due to formation of the supply channel in the solid electrolyte fuel battery 100 in which a gas supply channel and a cell are integrally formed.

On the other hand, in Comparative Example 2, since all portions of the fuel gas supply channel 23 and the air supply channel 24 have a small cross-section area, a cell voltage is found to be low.

The embodiments and examples disclosed herein are intended to illustrate the invention in all respects and are not to be construed to limit the invention. The scope of the invention is defined by the appended claims rather than by the above-mentioned embodiments and examples, and all modifications and variations which fall within the scope of the claims, or equivalence of the scope of the claims are therefore intended to be embraced in the scope of the invention.

According to the present invention, since the cross-section areas of the gas supply channels formed in the anode layer and the cathode layer in a cell, respectively, to which gases are supplied, are made larger and the cross-section areas of at least parts of the gas supply channels formed in a portion other than a cell are made smaller, it is possible to prevent a reduction in the strength of the solid electrolyte fuel battery in which a gas supply channel and a cell are integrally formed, and it becomes possible to uniformly supply a gas to the inside of the cell, and therefore the present invention is applicable to various types of solid electrolyte fuel batteries using a separator made of a ceramic material.

DESCRIPTION OF REFERENCE SYMBOLS

1 Unit module of a solid electrolyte fuel battery
11, 11a to 11d Fuel electrode layer
12 Solid electrolyte layer
13, 13a to 13d Air electrode layer
20 Solid electrolyte fuel battery support structure
21 Electrically insulating body
21a Intercellular separation part
21b Gas supply channel structure part
22 Electrical conductor
23, 23a, 23b Fuel gas supply channel
24, 24a, 24b Air supply channel
100 Solid electrolyte fuel battery

The invention claimed is:

1. A solid electrolyte fuel battery comprising:
a battery structure part including a plurality of cells, each cell including an anode layer, a solid electrolyte layer and a cathode layer;
an intercellular separation part disposed between adjacent cells of the plurality of cells and formed of a material containing a ceramic; and
a gas supply channel structure part having an anode gas supply channel for supplying an anode gas to each of the plurality of cells and a cathode gas supply channel for supplying a cathode gas to each of the plurality of cells,
wherein the anode gas supply channel includes a first anode gas supply channel part, at least a part of an inner wall surface of which is the anode layer, and a second anode gas supply channel part;
the cathode gas supply channel includes a first cathode gas supply channel part, at least a part of an inner wall surface of which is the cathode layer, and a second cathode gas supply channel part, and
a first cross-section area of the first anode gas supply channel part is larger than a second cross-section area of at least a portion of the second anode gas supply channel part and a third cross-section area of the first cathode gas supply channel part is larger than a fourth cross-section area of at least a portion of the second cathode gas supply channel part.

2. The solid electrolyte fuel battery according to claim 1, wherein a ratio of the first cross-section area of the first anode gas supply channel part to the second cross-section area of the at least the portion of the second anode gas supply channel part is 1.1 or more and 14 or less.

3. The solid electrolyte fuel battery according to claim 2, wherein a ratio of the third cross-section area of the first cathode gas supply channel part to the fourth cross-section area of the at least the portion of the second cathode gas supply channel part is 1.1 or more and 14 or less.

4. The solid electrolyte fuel battery according to claim 1, wherein a ratio of the third cross-section area of the first cathode gas supply channel part to the fourth cross-section area of the at least the portion of the second cathode gas supply channel part is 1.1 or more and 14 or less.

5. The solid electrolyte fuel battery according to claim 1, wherein a ratio of the first cross-section area of the first anode gas supply channel part to the second cross-section area of the at least the portion of the second anode gas supply channel part is 2 or more and 10 or less.

6. The solid electrolyte fuel battery according to claim 5, wherein a ratio of the third cross-section area of the first cathode gas supply channel part to the fourth cross-section area of the at least the portion of the second cathode gas supply channel part is 2 or more and 10 or less.

7. The solid electrolyte fuel battery according to claim 1, wherein a ratio of the third cross-section area of the first cathode gas supply channel part to the fourth cross-section area of the at least the portion of the second cathode gas supply channel part is 2 or more and 10 or less.

8. The solid electrolyte fuel battery according to claim 1, wherein at least one of the first anode gas supply channel part and the first cathode gas supply channel part has a rectangular cross-section.

9. The solid electrolyte fuel battery according to claim 1, wherein at least one of the second anode gas supply channel part and the second cathode gas supply channel part has a plurality of circular cross-sections arranged at intervals.

10. The solid electrolyte fuel battery according to claim 1, wherein the second anode gas supply channel part is in the solid electrolyte layer, the cathode layer and the intercellular separation part.

11. The solid electrolyte fuel battery according to claim 10, wherein the second cathode gas supply channel part is in the anode layer, the solid electrolyte layer and the intercellular separation part.

12. The solid electrolyte fuel battery according to claim 1, wherein the second cathode gas supply channel part is in the anode layer, the solid electrolyte layer and the intercellular separation part.

13. The solid electrolyte fuel battery according to claim 1, wherein the battery structure part, the intercellular separation part, and the gas supply channel structure part are integral.

14. The solid electrolyte fuel battery according to claim 1, wherein the intercellular separation part includes a plurality of electrical conductors that electrically connect the plurality of cells to each other.

15. The solid electrolyte fuel battery according to claim 1, wherein the ceramic is selected from the group consisting of yttria stabilized zirconia and ceria stabilized zirconia.

16. The solid electrolyte fuel battery according to claim 15, wherein a material of the solid electrolyte layer is selected from the group consisting of scandia ceria stabilized zirconia and scandia stabilized zirconia.

17. The solid electrolyte fuel battery according to claim 16, wherein a material of the anode layer is scandia ceria stabilized zirconia.

18. The solid electrolyte fuel battery according to claim 17, wherein a material of the cathode layer is scandia ceria stabilized zirconia.

* * * * *